United States Patent
Surply et al.

(10) Patent No.: US 12,013,746 B2
(45) Date of Patent: Jun. 18, 2024

(54) DEVICE, SYSTEM AND METHOD TO DETERMINE A STRUCTURE OF A CRASH LOG RECORD

(71) Applicant: Intel Corporation, Santa Clara, CA (US)

(72) Inventors: Pierre Surply, Munich (DE); Nicole Eidson, Gilbert, AZ (US); Jose Rivas Paz, Munich (DE)

(73) Assignee: Intel Corporation, Santa Clara, CA (US)

( * ) Notice: Subject to any disclaimer, the term of this patent is extended or adjusted under 35 U.S.C. 154(b) by 677 days.

(21) Appl. No.: 17/032,737

(22) Filed: Sep. 25, 2020

(65) Prior Publication Data
US 2022/0100598 A1 Mar. 31, 2022

(51) Int. Cl.
G06F 11/07 (2006.01)
G06F 11/30 (2006.01)
G06F 11/32 (2006.01)

(52) U.S. Cl.
CPC ...... G06F 11/0772 (2013.01); G06F 11/0745 (2013.01); G06F 11/0787 (2013.01); G06F 11/3065 (2013.01); G06F 11/327 (2013.01)

(58) Field of Classification Search
CPC ............ G06F 11/0772; G06F 11/0745; G06F 11/0787; G06F 11/3065; G06F 11/327
USPC ................................ 714/38.11, 48
See application file for complete search history.

(56) References Cited

U.S. PATENT DOCUMENTS

| | | | | |
|---|---|---|---|---|
| 2012/0110344 A1* | 5/2012 | Sadovsky | ........... | G06F 11/0748 714/E11.029 |
| 2015/0227410 A1* | 8/2015 | Jarrett | .............. | G01R 31/31705 714/45 |
| 2016/0180006 A1* | 6/2016 | Bandyopadhyay | ......................... | G01R 31/31705 716/112 |
| 2016/0283305 A1 | 9/2016 | Kugata | | |

(Continued)

FOREIGN PATENT DOCUMENTS

| CN | 109101358 A | * 12/2018 |
|---|---|---|
| CN | 109542752 | 3/2019 |
| CN | 109947585 | 6/2019 |

OTHER PUBLICATIONS

Office Action from Dutch Patent Application No. 2029030 dated May 25, 2022, 8 pgs.

*Primary Examiner* — Chae M Ko
(74) *Attorney, Agent, or Firm* — Essential Patents Group, LLP

(57) ABSTRACT

Techniques and mechanisms for logging crash event information based on a high-level representation of a structure that a crash log is to have. In an embodiment, a crash log agent logs information which describes system state to a record of a crash log. A structure of the record is defined by instructions which include a high-level reference to a type of information that is to be retrieved for logging to the record. Based on the high-level reference, the crash log agent accesses reference information which indicates a correspondence of the information type to a circuit resource with which state information is to be retrieved. A transaction unit of the crash log agent generates a command to target the circuit resource in response to an indication of a crash log event. In another embodiment, the transaction unit identifies the circuit resource prior to the crash log event.

20 Claims, 16 Drawing Sheets

(56) References Cited

U.S. PATENT DOCUMENTS

2019/0050231 A1\* 2/2019 Lysaght ................ G06F 9/3877
2019/0243701 A1 8/2019 Kurts et al.

\* cited by examiner

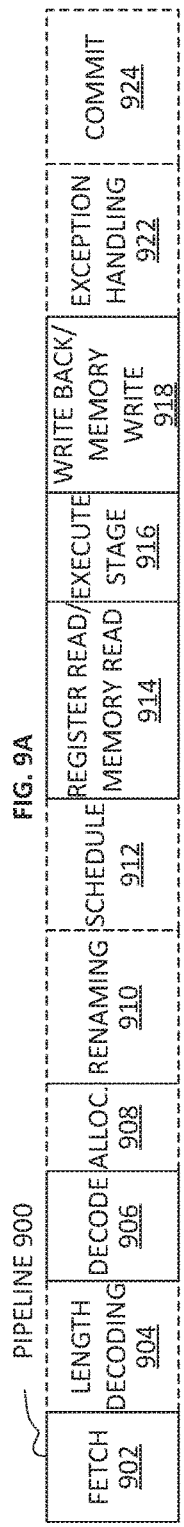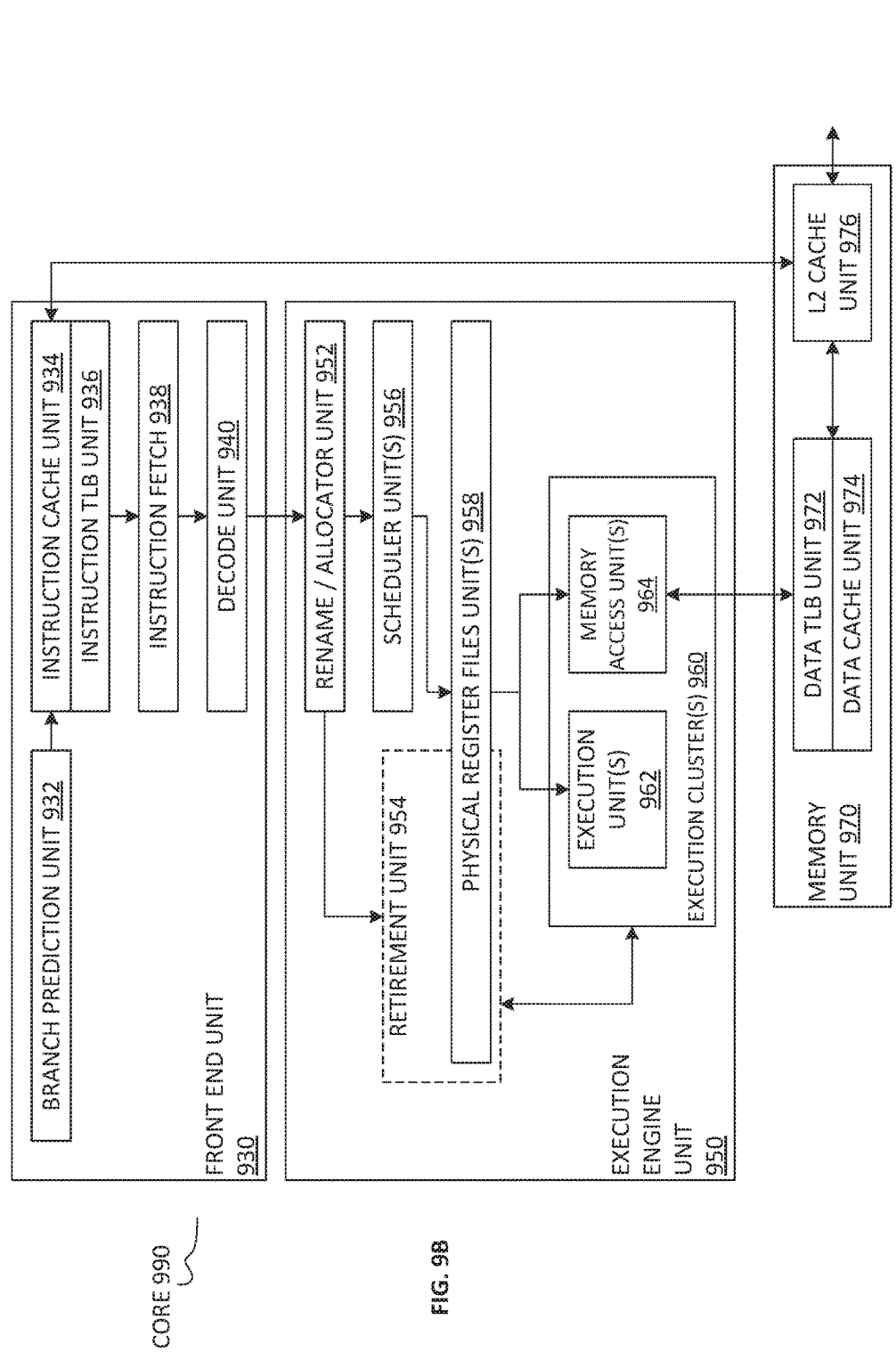

DEVICE, SYSTEM AND METHOD TO DETERMINE A STRUCTURE OF A CRASH LOG RECORD

BACKGROUND

1. Technical Field

This disclosure generally relates to system testing and debugging and more particularly, but not exclusively, to the logging of information which describes a system crash event.

2. Background Art

Existing crash log agents rely on updated firmware, from an external agent, to change the format/layout of a crash log. The updated firmware includes low-level instructions to retrieve and log state information from IPs. More particularly, the crash log format/layout is implicit in (integral with) these instructions, which include explicit lowest-level identifiers of IPs and their various registers (from which state information is to be retrieved).

Modern system-on-chips (SOCs) often implement a dedicated circuit logic for detecting hangs and uncorrectable errors. This circuit logic automatically captures and saves information describing state of the SOC during the failure in order to allow post-mortem analysis and telemetry. Creating a snapshot of platform state is complex, and is usually tightly coupled with a reset sequence and/or overall power management. As a result, circuit logic to implement power management is often tasked with obtaining the SOC snapshot—before proceeding to the system reset—for storage in a non-volatile memory. In practice, such approaches have been proven to be fundamentally complex, disparate across different SOC architectures, and sometimes too imposing on the strict timing requirements of the power management flow.

As SOC circuitry continues to scale in size, capability, and diversity, there is expected to be an increasing premium placed on improvements to the collecting of state information for use in diagnosing the causes of system crash events.

BRIEF DESCRIPTION OF THE DRAWINGS

The various embodiments of the present invention are illustrated by way of example, and not by way of limitation, in the figures of the accompanying drawings and in which:

FIG. 9A is a block diagram illustrating both an exemplary in-order pipeline and an exemplary register renaming, out-of-order issue/execution pipeline according to embodiments of the invention.

FIG. 9B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
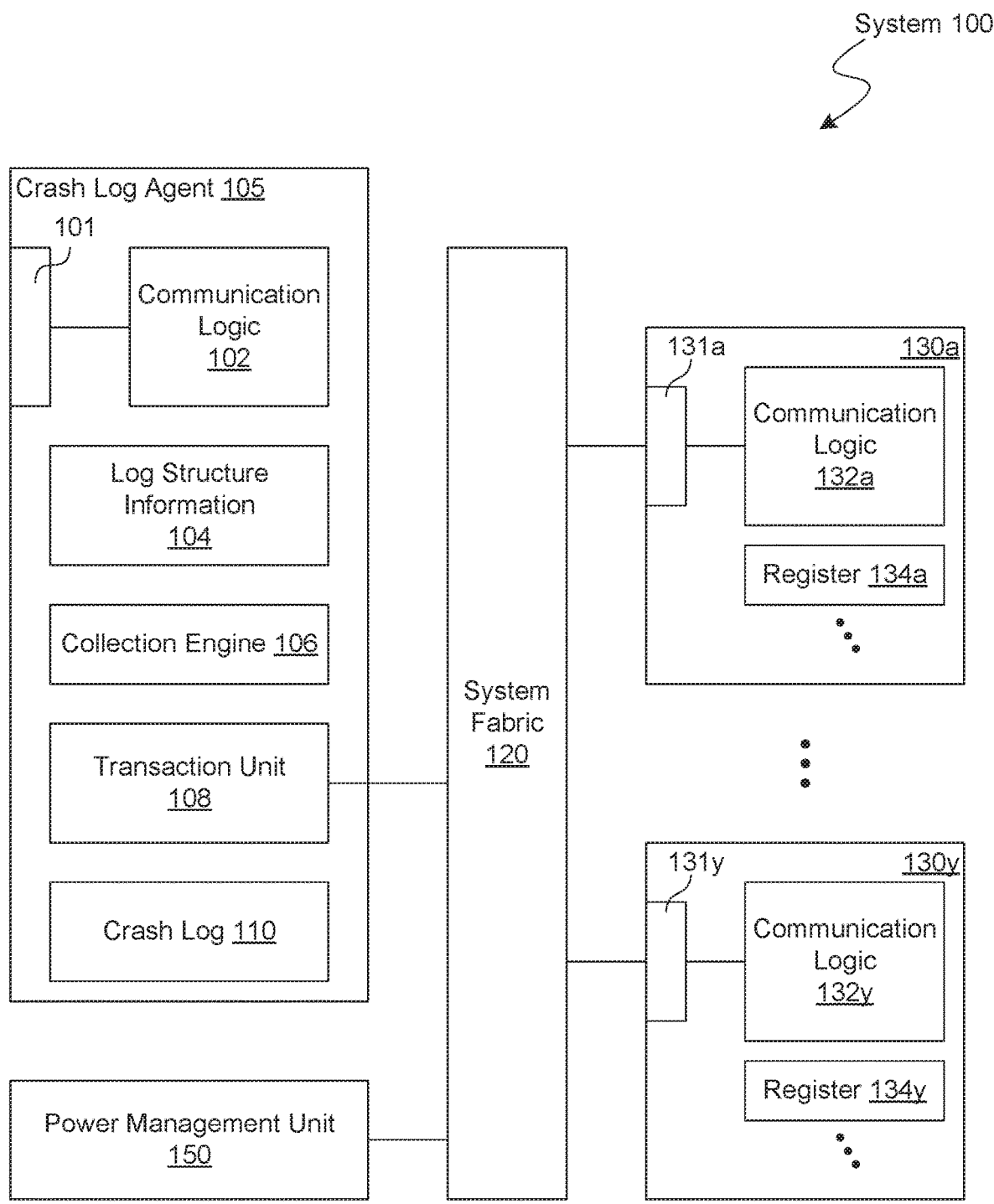
FIG. 1 illustrates a functional block diagram showing features of a system to generate a crash log according to an embodiment.

Embodiments discussed herein variously provide techniques and mechanisms for logging crash event information based on a high-level representation of a structure that a crash log is to have. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to log state information to a crash log.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments variously create a record of a crash log based on information—referred to herein as "log structure information"—which explicitly or implicitly defines a format, layout and/or other structure that the record is to have. For example, instructions and/or other suitable log structure information comprise relatively high-level (abstract) labels, or combinations of labels, to indirectly refer to one or more functional blocks and various registers thereof. In one such embodiment, circuitry (referred to herein as a "crash log agent") translates, decodes, compiles or otherwise processes these relatively high-level references to variously generate commands to retrieve state information from the one or more functional blocks.

As compared to some existing crash log techniques, the use of relatively high-level instructions of the log structure information simplifies the representation of a crash log format/layout. Alternatively or in addition, such log structure information facilitates more scalable solutions for crash log structures to be similarly updated across system-on-chips (SOCs) of one or more types. For example, some embodiments support the patching (updating) of log structure information independent of the patching (if any) of other firmware image information that, for example, is used across multiple SOCs.

Certain features of various embodiments are described herein with reference to the logging of state information in a record of a crash log, wherein a structure of the record is according to log structure information. A crash log comprises at least one record including state information which corresponds to a particular system crash event that, for example, forces one or more processors to export (e.g., save) or otherwise loose state. The crash log is to include one or more records each corresponding to a different respective one (and, for example, only one) instance of a crash event. As used herein, "crash log record" refers to an individual record of a crash log. A crash log record is associated with a system crash event at least in so far as the record is generated in response to an indication that the system crash event has occurred, or (according to some previous defined criteria) is expected to occur.

In the context of a crash log record, "state information" refers herein to information which specifies or otherwise indicates a state of a given circuit resource at a given time which is associated with the corresponding crash event. Such state includes, for example, one or more conditions of the circuit resource and/or one or more conditions of an environment in which the circuit resource operates. By way of illustration and not limitation, such state includes information retrieved from one or more buffers, mode registers, memory arrays and/or other such storage resources. In some embodiments, state information identifies the respective levels of one or more supply (or other) voltages, levels of current consumptions and/or other such metrics of power usage. Alternatively or in addition, state information identifies the current values of one or more threshold levels that are to regulate or otherwise control one or more operations of the system. Various embodiments facilitate the retrieval of state information such as that which is typically collected according to conventional techniques for capturing system state. Some embodiments are not limited to a particular one or more types of state information that are to be captured in a given crash log record.

As used herein, "log structure information" refers to metadata, instructions and/or any of various other suitable types of information which specify or otherwise indicates an order, formatting and/or other structure according to which state information is to be included in a given crash log record. In various embodiments, log state information explicitly or implicitly defines structure that an individual record is to have. For example, such log state information determines a correspondence of various fields of a crash log record format each to a different respective condition of a system state. For each of said fields, the field is to store a parameter value or other such information to represent the corresponding condition. In one such embodiment, log structure information determines a relative order of the fields, and (for example) respective sizes of some or all such fields. Alternatively or in addition, the log structure information specifies or otherwise indicates a unit of measurement, encoding scheme, or other convention by which a given state condition is to be represented by a particular one or more values in the corresponding field.

FIG. 1 shows features of a system 100 to generate a crash log according to an embodiment. System 100 is one example of an embodiment wherein circuitry provides functionality to interpret information which determines a structure of a crash log record. The interpretation comprises or otherwise results in an identifying of one or more circuit resources to target each with a respective command to retrieve state information. In some embodiments, system 100 includes some or all circuitry of a system on chip (SoC), for example.

As shown in FIG. 1, system 100 comprises a crash log agent 105 and one or more circuit resources (e.g., comprising the illustrative functional blocks 130a, . . . , 130y shown) which are variously coupled thereto. Crash log agent 105 comprises one or more microcontrollers, state machines, application specific integrated circuits (ASICs) and/or any of various other types of circuitry which are configured to perform functions such as those described herein. In some embodiments, crash log agent 105 facilitates coupling to, but is to be distinguished from, any processor of system 100.

Functional blocks 130a, . . . , 130y illustrate any of a variety of one or more circuit resources from which crash log agent 105 is to retrieve state information for logging to a crash log record. By way of illustration and not limitation, functional blocks 130a, . . . , 130y variously comprise one or more processors, memory devices, memory controllers (or other controller circuitry), hub devices, power management circuits, sensors and/or the like. However, system 100 comprises more, fewer or different circuit resources, in other embodiments, which are not limited to a particular functionality that is provided by any given one functional block.

In the example embodiment shown, a system fabric 120 of system 100 facilitates coupling of crash log agent 105 to respective hardware interfaces 131a, . . . , 131y of functional blocks 130a, . . . , 130y. The system fabric 120 comprises one or more busses and/or other interconnect structures whereby a circuit resource of crash log agent 105 (such as the illustrative transaction unit 108 shown) is to retrieve any of various types of state information each from a respective one of functional blocks 130a, . . . , 130y. Transaction unit 108 provides functionality to generate one or more commands each to access a respective one of functional blocks 130a, . . . , 130y. In various embodiments, system 100 omits system fabric 120 and/or one or more of functional blocks 130a, . . . , 130y—e.g., where some or all such embodiments are provided entirely with circuitry of crash log agent 105.

Some or all of hardware interfaces 131a, . . . , 131y each comprise any of various transmitter circuits, receiver circuits, and/or other suitable circuitry to facilitate communication with transaction unit 108. For example, transaction unit 108 comprises circuitry to participate in communications with communication logic 132a of functional block 130a—e.g., where such communications are to access one or more registers of functional block 130a (e.g., including the illustrative register 134a shown). Alternatively or in addition, transaction unit 108 is operable to participate in communications with communication logic 132y of functional block 130y—e.g., where such communications are to access one or more registers of functional block 130y (e.g., including the illustrative register 134y shown). In various embodiments, such communication between transaction unit 108 and functional blocks 130a, . . . , 130y comprises one or more operations that, for example, are adapted from conventional techniques for gathering state information in response to a crash event.

Circuitry of crash log agent 105 (e.g., including that of the illustrative collection engine 106 shown) is operable to generate, write to, or otherwise access a crash log record. In various embodiments, crash log agent 105 comprises (or alternatively, is coupled to have access to) one or more memory resources to variously store a crash log, and log structure information which is to determine a structure of a given record of said crash log. Such memory resources comprise, for example, one or more nonvolatile memories— e.g., including a phase change memory (PCM), 3D XPoint memory, or the like—that are able to persist data from prior to a crash event to a time of a recovery from the crash event.

In the example embodiment shown, a first memory resource of crash log agent 105 is coupled to receive and store log structure information 104—e.g., where a second memory resource is coupled to store a crash log 110, one or more records of which are based on log structure information 104. In some embodiments, a single memory array comprises both the first memory resource and the second memory resource. In other embodiments, such memory resources comprise different respective arrays and/or other data repositories—e.g., wherein log structure information 104 is stored in the first array, and crash log 110 is stored in another one or more memory arrays.

In various embodiments, crash log agent 105 is discoverable—e.g., by an operating system that is executed with a processor of system 100 and/or by a firmware driver—to enable a user or other external agent to read from and/or write to the first memory resource used to store log structure information 104, the second memory resource used to store crash log 110, and—in some embodiments—any other memory resource used (for example) to store one or more other configuration spaces of crash log agent 105. In one such embodiment, one or more memory regions of crash log agent 105 are accessible by host software and/or via a physical debug connection—such as one compatible with a Joint Test Action Group (JTAG) standard. By way of illustration and not limitation, communication logic 102 facilitates communications (e.g., via the illustrative hardware interface 101 shown) to provide crash log agent 105 with log structure information 104 and, in some embodiments, reference information (or other configuration state) to facilitate a retrieval of state information based on log structure information 104. In some embodiments, hardware interface 101 is coupled to facilitate such communications via one or more interconnects of system fabric 120. Log structure information 104 is part of an integrated firmware image (IFWI), in various embodiments—e.g., where log structure information 104 is provided to crash log agent 105 as part of the platform boot flow.

In some embodiments, log structure information 104 defines the structure of a crash log record with one or more generic (e.g., high-level) identifiers each of a respective information type. By way of illustration and not limitation, such a generic identifier comprises a reference to a type of circuit resource (e.g., a type of transaction unit) with which said information is to be retrieved. Alternatively or in addition, a generic identifier comprises a reference to a type of functional block (and, for example, a type of register of said functional block) from which said information is to be retrieved. In various embodiment, the generic identifier—in and of itself—does not explicitly identify a specific register which is a repository of information to be retrieved. For example, such embodiments variously perform one or more operations—e.g., based on the generic identifier and additional reference information—to identify the specific register. In an embodiment, log structure information 104 comprises relatively high-level instructions to access state information, where such high-level instructions are to be decoded or otherwise processed each to determine a respective one or more commands to access state information at functional blocks 130a, . . . , 130y. Such instructions of log structure information 104 are available, for example, to be exposed to a user of system 100 (although other embodiments prevent such exposure to a user). Alternatively or in addition, such instructions are based on a standard (e.g., non-proprietary) instructions set, for example, although other embodiments are not limited in this regard.

By way of illustration and not limitation, for a given information type, a generic identifier of the type is provided in log structure information 104 to indicate a first correspondence of that information type to a respective field of a record structure. Configuration state of collection engine 106 (e.g., including reference information available at crash log agent 105) specifies or otherwise indicates a correspondence of one or more information types each to a respective one or more of functional blocks 130a, . . . , 130y. Collection engine 106 accesses or otherwise uses such configuration state—e.g., based on a generic identifier in log structure information 104—to determine a second correspondence of an information type to a particular functional block of functional blocks 130a, . . . , 130y (or at least to a particular transaction resource which is designated to provide access to said functional block).

By way of illustration and not limitation, based on an identification of the second correspondence, collection engine 106 identifies transaction circuitry (such as a particular resource of the illustrative transaction unit 108 shown) as being allocated or otherwise configured to retrieve state information of the referenced information type. Accordingly, collection engine 106 signals to transaction unit 108 that transaction unit 108 is to send a command, in response to an indication of a crash event, to retrieve state information of the referenced information type. In various embodiment, transaction unit 108 performs further processing, based on the referenced information type, to identify a particular register (of a particular functional block) as being a repository of the state information to be retrieved. Subsequently, in response to an indication of a crash event, transaction unit 108 sends a command to access said register.

Creating a snapshot of system state is a complex flow which, in conventional techniques, is tightly coupled (for example) with a reset sequence and overall power management, such as that provided by the illustrative power management unit (PMU) 150 shown. As a result, conventional power management agents are usually assigned the responsibility of capturing a snapshot of system state, and storing the snapshot in non-volatile memory (or in an "always on" memory) before proceeding to the actual system reset. Traditionally, this implementation has been proven to be fundamentally complex, disparate across different system architectures, and sometimes too intrusive in the power management flow, which is subject to strict timing requirements. By contrast, in capturing system state with command generator functionality of crash log agent 105, some embodiments avoid or otherwise mitigate the risk of interference with power management and/or system reset functionality provided with PMU 150.

Figure 2:
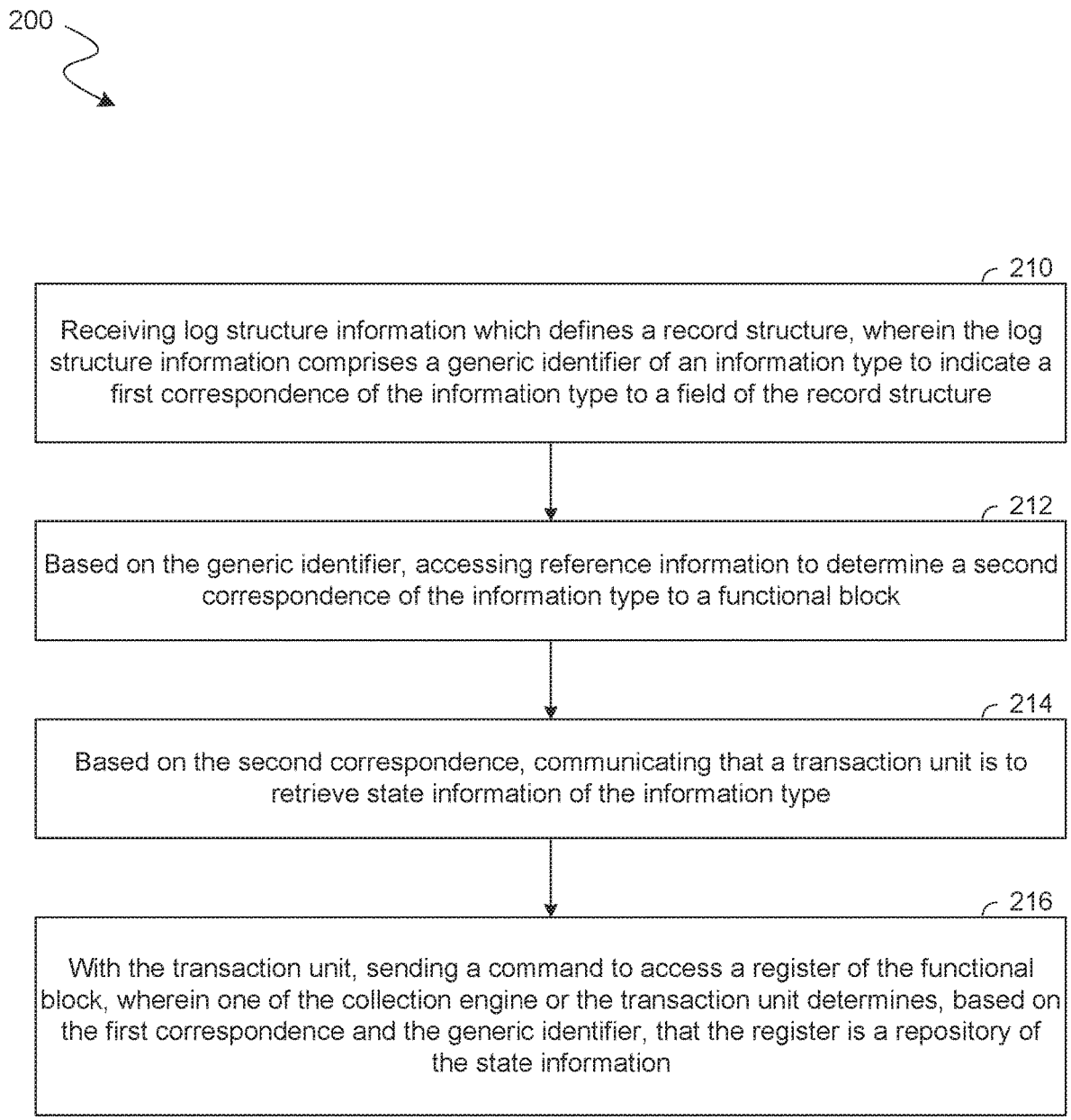
FIG. 2 illustrates a flow diagram showing features of a method for requesting state information to be saved in a crash log according to an embodiment.

FIG. 2 shows features of a method 200 for requesting state information to be saved in a crash log according to an embodiment. Method 200 is one example of an embodiment wherein one or more commands to retrieve state information are generated based on information which defines a structure of a crash log record. The information comprises a high-level reference to an information type, where the reference indicates a corresponding circuit resource from which state information is to be retrieved. In various embodiments, method 200 is performed with collection engine 106 and/or other such circuitry which provides some or all functionality of system 100.

As shown in FIG. 2, method 200 comprises (at 210) receiving—at a collection engine of a crash log agent— log structure information which defines a record structure. The collection engine is coupled to a functional block comprising a register which is a repository of information of a particular information type. The log structure information comprises a generic identifier of the information type to indicate a first correspondence of the information type to a field of the record structure Method 200 further comprises (at 212) accessing reference information, based on the generic identifier, to determine a second correspondence of the information type to the functional block. For example, the accessing at 212 comprises the collection engine performing a table lookup, translation, decoding or other such operation to identify, based on the information type, a specific functional block (or alternatively, a generic block type to which the specific functional type belong). Alternatively or in addition, the accessing at 212 comprises the collection engine performing such operation to identify a particular transaction unit with which the functional block is to be accessed.

Method 200 further comprises (at 214) communicating, based on the second correspondence, that a transaction unit of the crash log agent is to retrieve state information of the information type. For example, the communicating at 214 includes the transaction unit receiving from the collection engine information which indicates a repository from which the state information is to be retrieved. Method 200 further comprises (at 216) sending a command, with the transaction unit, to access the register in response to an indication of a crash event.

One of the collection engine or the transaction unit determines, based on the first correspondence and the generic identifier, that the register is a repository of the state information. For example, the reference information accessed at 212 is first reference information, wherein the transaction unit comprises (or otherwise has access to) second reference information which the transaction unit uses to identify a specific register from which the state information is to be retrieved. In one such embodiment, for each of multiple register types, the second reference information identifies a respective indicator to target a register which is of that register type. In some embodiments, the second reference information further identifies a correspondence of functional blocks (or respective types of said functional blocks) each with a respective one or more register types.

In an illustrative scenario according to one embodiment, the functional block is a first functional block of multiple functional blocks which are coupled to the crash log agent—e.g., wherein the transaction unit is a first transaction unit of multiple transaction units of the crash log agent. The multiple transaction units are each coupled to communicate with a different respective one or more of the multiple functional blocks. For example, the reference information identifies a correspondence of multiple transaction units each with a different respective one or more functional block types. The reference information identifies the first transaction unit as being coupled to support communication with the first functional block, wherein the collection engine selects the first transaction unit from among the multiple transaction units based on the generic identifier and the reference information. Based on such selection, the first transaction unit sends the command at 216 to retrieve state information of the information type. In one such embodiment, for each transaction unit of the multiple transaction units, the collection engine indicates to that transaction unit a respective one or more registers of the multiple functional blocks that the transaction unit is to access. Subsequently, the multiple transaction units each detect a respective indication of the crash event, and retrieve respective state information to facilitate creation of the crash log record.

In some embodiments, method 200 further comprises one or more operations (not shown) to log information to a crash log record based on the state information which is requested by the command sent at 216. Such one or more operations include, for example, the transaction unit receiving state information in a response to the command, and (in some embodiments) storing the state information locally until it is requested by the collection engine. In some embodiments, the transaction unit aggregates for the collection engine state information retrieved from multiple different functional blocks and/or multiple registers of a given functional block. Additionally or alternatively, the transaction unit provides a formatting, ordering or other manipulation of some or all retrieved state information.

Figure 3:
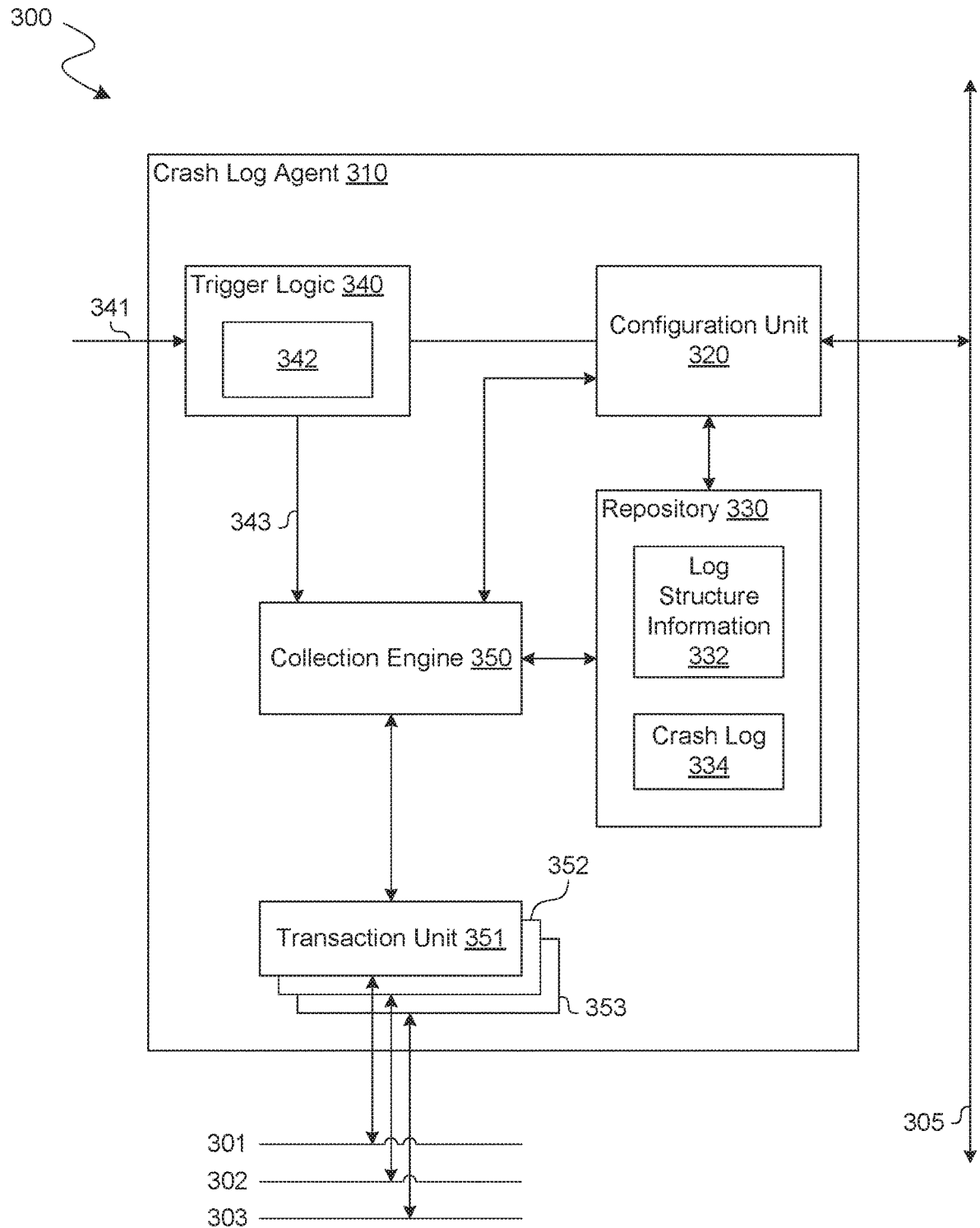
FIG. 3 illustrates a functional block diagram showing features of an integrated circuit chip to log information in response to a system crash according to an embodiment.

FIG. 3 shows features of an integrated circuit (IC) chip 300 to log information in response to a system crash according to an embodiment. IC chip 300 is one example of an embodiment wherein circuitry is operable to generate a request for state information to be saved in a crash log, wherein, based on a generic identifier of an information type, the request targets a specific register from which the state information is to be retrieved. In various embodiments, IC chip 300 includes features of crash log agent 105—e.g., where functionality of IC chip 300 is provided according to method 200.

As shown in FIG. 3, IC chip 300 comprises a crash log agent 310 which is coupled, for example, to one or more processors (not shown) via a system bus 305. Crash log agent 310 provides some or all of the functionality of crash log agent 105—e.g., wherein log structure information 332, a crash log 334, and a collection engine 350 of crash log agent 310 correspond functionally to log structure information 104, crash log 110, and collection engine 106 (respectively). In one such embodiment, a configuration unit 320 of crash log agent 310 provides some or all of the functionality of communication logic 102.

Crash log agent 310 further comprises multiple transaction units which each couple crash log agent 310 to a respective one or more functional blocks (not shown). For example, transaction units 351, 352, 353 of IC chip 300 are each coupled to a corresponding one or more functional blocks via buses 301, 302, 303 (respectively). In an embodiment, transaction units 351, 352, 353 variously provide functionality of transaction unit 108, for example.

Crash log agent 310 further comprises circuitry (such as the illustrative trigger logic 340 shown) which is coupled to receive a signal 341 which specifies or otherwise indicates a condition of IC chip 300. Trigger logic 340 includes, has access to, or otherwise operates based on some predetermined criteria 342 for determining whether such a condition of IC chip 300 is indicative of an actual (or expected) crash event. Where such a crash event is indicated by signal 341, trigger logic 340 generates a signal 343 to trigger a collection of state information to facilitate the creation of other accessing of a crash log record.

Collection engine 350 provides functionality to access log structure information 332, to determine a log structure based on log structure information 332, and—based on the log structure—to select one or more of transaction units 351, 352, 353 each to retrieve respective state information to include in a crash log. For example, in various embodiments, log structure information 332 (e.g., a high-level instruction thereof) comprises a generic reference to a type $i_n$ of information that is to be retrieved to facilitate creation of a record of crash log 334. By way of illustration and not limitation, such a generic reference identifies or otherwise indicates a type $R_{yz}$ of a register from which the information is to be retrieved, and/or a type $F_y$ of a functional block which includes such a register. Based on the generic reference, crash log agent 310 performs one or more operations to identify a specific functional block $f_y$ (and, more particularly, a specific register $r_{yz}$ of said functional block $f_y$) which is to be targeted by a command to retrieve state information of the referenced information type $i_n$.

In an illustrative scenario according to one embodiment, crash log agent 310 is coupled to functional blocks which are each of a respective type $F_y$ of Y functional block types $\{F_1, \ldots, F_Y\}$ (e.g., where index y is any integer from 1 to Y). Crash log agent 310 comprises a set $\{T_x\}$ of X transaction units (e.g., where index x is any integer from 1 to X), where a given transaction unit $T_x$ is coupled to access a respective one or more of the functional blocks. A given functional block $F_y$—of a particular functional block type $F_y$—comprises registers which are each of a respective type $R_{yz}$ of Z register types $\{R_{y1}, \ldots, R_{yZ}\}$ (e.g., where index z is any integer from 1 to a respective Z for that functional block $f_y$.)

In one such embodiment, reference information (not shown)—e.g., in repository 330 or any of various other suitable storage resources—is used by collection engine 350 and/or a transaction unit, such as one of transaction units 351, . . . , 353, to identify a particular register $r_{yz}$ which is to be targeted to retrieve state information of a referenced information type $i_n$. For example, such reference information identifies a correspondence of the information type $i_n$ to a transaction unit $T_x$ with which state information of the type $i_n$ is to be accessed. Alternatively or in addition, the reference information identifies a correspondence of a particular transaction unit $T_x$ to a type $F_y$ of functional block (or a particular functional block $f_y$ of that type $F_y$) for which transaction unit $T_x$ provides access. Alternatively or in addition, the reference information identifies a correspondence of the functional block type $F_y$ to a particular functional block $f_y$ which is of that type $F_y$. Alternatively or in addition, the reference information identifies a correspondence of the functional block type $F_y$ (and/or a particular functional block $f_y$ of that type $F_y$) to a type $R_{yz}$ of register which functional blocks of the type $F_y$ each have. Alternatively or in addition, the reference information identifies a correspondence of the register type $R_{yz}$ to a specific register $r_{yz}$ which is of that type $R_{yz}$.

In the example embodiment shown, collection engine 350 processes a generic reference to an information type $i_n$ and, based on such processing, to select one of transaction units 351, . . . , 353. Based on such selection, collection engine 350 communicates to the selected transaction unit the generic reference to information type $i_n$ (or, for example, information which collection engine 350 has determined based on said generic reference). Based on such communication, the selected transaction unit performs a look-up, translation or other operation to identify a particular register to target for retrieving state information. The targeting comprises the selected transaction unit sending a read command, in response to the indication of a trigger event by signal 343, to the functional block which includes the register.

Figure 4:
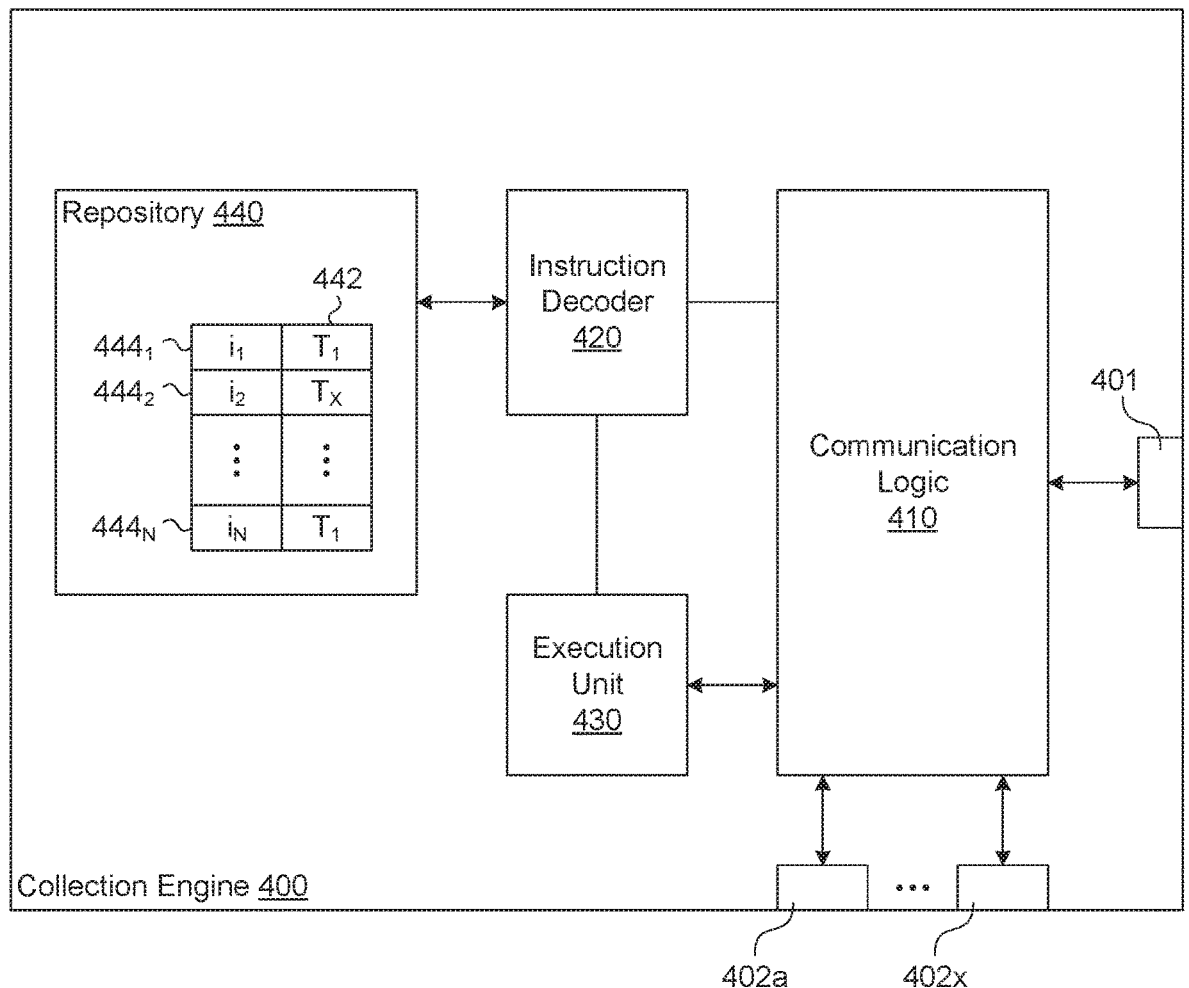
FIG. 4 illustrates a functional block diagram showing features of a collection engine to create a record of a crash log according to an embodiment.

FIG. 4 shows features of a collection engine 400 to create a record of a crash log according to an embodiment. In various embodiments, collection engine 400 includes features of one of collection engine 106 or collection engine 350—e.g., where collection engine 400 performs some or all of method 200.

As shown in FIG. 4, collection engine 400 comprises a hardware interface 401 and communication logic 410 which supports communication via hardware interface 401 to access one or more instructions which, for example, are provided as log structure information 104 or log structure information 332. Collection engine 400 further comprises one or more other hardware interfaces—e.g., including the illustrative hardware interfaces 402a, . . . , 402x shown—each to communicate with a respective transaction unit (such as one of transaction units 351, . . . , 353).

In an embodiment, communication logic 410 accesses log structure information via hardware interface 401 and provides such log structure information to instruction decoder 420 of collection engine 400. Instruction decoder 420 comprises circuitry to decode, translate, convert or otherwise process such log structure information—e.g., wherein instruction decoder 420 identifies a particular transaction unit as corresponding to an information type which is referenced by the log structure information.

For example, a repository 440 of collection engine 400 comprises a table 442 (or any of various other suitable data structures) which specifies or otherwise indicates a correspondence of one or more information types each with a respective transaction unit. In an illustrative scenario according to one embodiment, table 442 identifies a correspondence of some or all of N information types $\{i_n\}$ each with a respective one of X transaction units $\{T_x\}$ (where the index x is any integer value from 1 to X). By way of illustration and not limitation, an entry $444_1$ of table 442 corresponds the information type $i_1$ with a transaction unit $T_1$—e.g., where an entry $444_2$ of table 442 corresponds the information type $i_2$ with a transaction unit $T_X$, and where an entry $444_N$ of table 442 corresponds the information type $i_N$ with the transaction unit $T_1$.

In one such embodiment, instruction decoder 420 accesses table 442 based on the log structure information to identify and select a particular transaction unit to be tasked with retrieving state information of the referenced information type—e.g., wherein collection engine 400 indicates the information type to the selected transaction unit via one of hardware interface 402a, . . . , 402x. In one such embodiment, execution unit 430 of collection engine 400 communicates with the selected transaction unit to identify the information type. Alternatively or in addition, execution unit 430 is coupled to detect for an indication of a crash event and, in response, to trigger the collection of state information with some or all of the transaction units which are coupled via hardware interfaces 402a, . . . , 402x.

In an illustrative scenario according to one embodiment, collection engine 400 is collection engine 350, wherein crash log agent 310 is coupled to a first functional block which (for example) comprises a processor core including general purpose registers RAX, RBX, RCX and RDX that are typical of an x86-type architecture. In one such embodiment, log structure information 332 specifies or otherwise indicates that fields in a record of crash log 334 are each to store state information from a different respective one of the general purpose registers RAX, RBX, RCX and RDX. For example, log structure information 332 comprises the following instructions:

| | |
|---|---|
| StartRecord(VERSION_ID0) | # Create a new record with a version ID set as 'VERSION_ID0' |
| SelectTransactor(CoreArchTransactor) | # Select a transaction resource of a type which corresponds to communication with a processor |
| ConfigureTransactor(CoreID, 0) | # Select a first core of a processor |

| | |
|---|---|
| ConfigureTransactor(ThreadID, 0) | # Select a first thread of the processor |
| CollectRegisters(RAX, RBX, RCX, RDX) | # Read the registers from the selected core and store them in the Crash Log storage |
| EndOfCollection( ) | # End the collection of the Crash Log |

The instructions illustrated above are "high-level" at least insofar as they include one or more labels which only indirectly reference respective resources from which state information is to be retrieved.

By way of illustration and not limitation, in various embodiments, the label "CoreArchTransactor" in the above instructions is a generic (high-level) reference to a type of transaction circuitry that supports communication with at least some type(s) of processor circuitry. However, in one such embodiment, the label "CoreArchTransactor"—in and of itself—is insufficient for some specific transaction circuitry of crash log agent 310 to be selected for use in accessing the processor at the first functional block. To facilitate such selection, table 442 identifies a correspondence of the label "CoreArchTransactor" with such specific transaction circuitry of crash log agent 310. Based on reference information of table 442, instruction decoder 420 translates, interprets or otherwise processes the label "CoreArchTransactor" in the instructions to identify and select the corresponding transaction unit (in this example, transaction unit 351) for use in communicating with the processor core of the first functional block.

Alternatively or in addition, the combination "(CoreID, 0)" in the above instructions serves as a generic reference to a type of processor core that is accessible at least by transaction circuitry which is of the type "CoreArchTransactor." For example, "(CoreID, 0)" is a high-level reference to any core which is an initial (e.g., first) core in a particular ranking or other ordering of multiple cores in a given processor. However, in one such embodiment, the combination "(CoreID, 0)"—in and of itself—is insufficient for transaction unit 351 to target a specific processor core at the first functional block. To facilitate such targeting, instruction decoder 420 (or alternatively, transaction unit 351) avails of some predetermined configuration state which identifies a correspondence of the combination "(CoreID, 0)" with a specific processor core at the first functional block. Based on such configuration state, one of instruction decoder 420 or transaction unit 351 processes the combination "(CoreID, 0)" in the instructions to identify and target the corresponding processor core at the first functional block.

Alternatively or in addition, the combination "(Thread, 0)" in the above instructions serves as a generic reference to a type of thread that can be executed at least by a core of the type referenced by "(CoreID, 0)." For example, "(ThreadID, 0)" is a high-level reference to any thread which is an initial (e.g., first) thread in some ranking or other order of multiple threads which are executed by a given core. However, in one such embodiment, the combination "(ThreadID, 0)"—in and of itself—is insufficient for transaction unit 351 to target a specific thread executed at the first functional block. To facilitate such targeting, instruction decoder 420 (or alternatively, transaction unit 351) avails of some predetermined configuration state which identifies a correspondence of the combination "(ThreadID, 0)" with a specific thread executed at the first functional block. Based on such configuration state, one of instruction decoder 420 of transaction unit 351 processes the combination "(ThreadID, 0)" in the instructions to identify and target the corresponding thread which is executed at the first functional block.

Alternatively or in addition, the labels "RAX," "RBX," "RCX," and "RDX" are generic (high-level) references each to a different respective type of general purpose register of a processor core. However, in one such embodiment, the combination some or all of these labels are insufficient for transaction unit 351 to target specific registers of a processor core at the first functional block. To facilitate such targeting, instruction decoder 420 (or alternatively, transaction unit 351) avails of some predetermined configuration state which identifies a correspondence of the labels "RAX," "RBX," "RCX," and "RDX" each with a different specific register of the processor core at the first functional block. Based on such configuration state, one of instruction decoder 420 or transaction unit 351 processes labels "RAX," "RBX," "RCX," and "RDX" in the instructions to identify and target the corresponding registers of processor core at the first functional block.

In one example embodiment, an evaluation of the high-level label "CoreArchTransactor" is performed by circuitry of collection engine 400—e.g., where transaction unit 351 is selected based on said evaluation. Subsequently, the selected transaction unit 351 performs further processing of one or more other high-level labels of log structure information 332—e.g., including some or all of "(CoreID, 0)," "(ThreadID, 0)," "RAX," "RBX," "RCX," and "RDX." For example, transaction unit 351 comprises some local reference information and/or other suitable configuration state, which the transaction circuitry uses to identify and target a specific register of a specific processor core at a particular functional block.

In an illustrative scenario according to another embodiment, collection engine 400 is collection engine 350, wherein crash log agent 310 is coupled to a first functional block which (for example) comprises four PCIe Advanced Error Reporting (AER) registers for two PCIe instances. The four registers—which are accessed, for example, using an integrated on-chip system fabric (IOSF) sideband interconnect—store an uncorrectable Error Status (UES) value for a PCIe instance PCIe 0, a correctable Error Status (CES) value for PCIe 0, a UES value for another PCIe instance PCIe 1, and a CES value for PCIe 1. In one such embodiment, log structure information 332 specifies or otherwise indicates that fields in a record of crash log 334 are each to store a different respective one of the status values. For example, log structure information 332 comprises the following instructions:

| | |
|---|---|
| StartRecord(VERSION_ID1) | # Create a new record with a version ID set as 'VERSION ID1' |
| SelectTransactor(IOSFSideBandTransactor) | # Select the transaction unit for IOSF side band |
| ConfigureTransactor(PortID, PCIE_INSTANCE0_PORTID) | # Select a first PCIe instance |
| CollectRegisters(UES_REG_OFFSET, CES_REG_OFFSET) | # Collect the AER registers for the first PCIe instance |
| ConfigureTransactor(PortID, PCIE_INSTANCE1_PORTID) | # Select a second PCIe instance |
| CollectRegisters(UES_REG_OFFSET, CES_REG_OFFSET) | # Collect the AER registers from the second PCIe instance |
| EndOfCollection( ) | # End the collection of the Crash Log |

In one such embodiment, the label "IOSFSidebandTransactor" in the above instructions is a high-level reference to a type of transaction unit which supports access to an IOSF sideband interconnect—e.g., where the label "PCIE_INSTANCE0_PORTID" is a low-level identifier of a PCIe instance PCI 0, and where the label "PCIE_INSTANCE1_PORTID" is a low-level identifier of a PCIe instance PCI 1. Furthermore, the label "UES_REG_OFFSET" is a low-level identifier of the UES register for a given PCIe instance, and the label "CES_REG_OFFSET" is a low-level identifier of the CES register for the given PCIe instance.

To facilitate targeting of the four PCIe AER registers, instruction decoder 420 avails of some predetermined configuration state (e.g., at table 442) which identifies a correspondence of the label "IOSFSidebandTransactor" with a particular one of transaction units 351, ..., 353. In one such embodiment, instruction decoder 420 provides the corresponding transaction unit with the identifiers "PCIE_INSTANCE0_PORTID," "PCIE_INSTANCE1_PORTID," "UES_REG_OFFSET," and "CES_REG_OFFSET," which the transaction unit subsequently uses to variously target the corresponding four registers for collecting state information.

Figure 5:
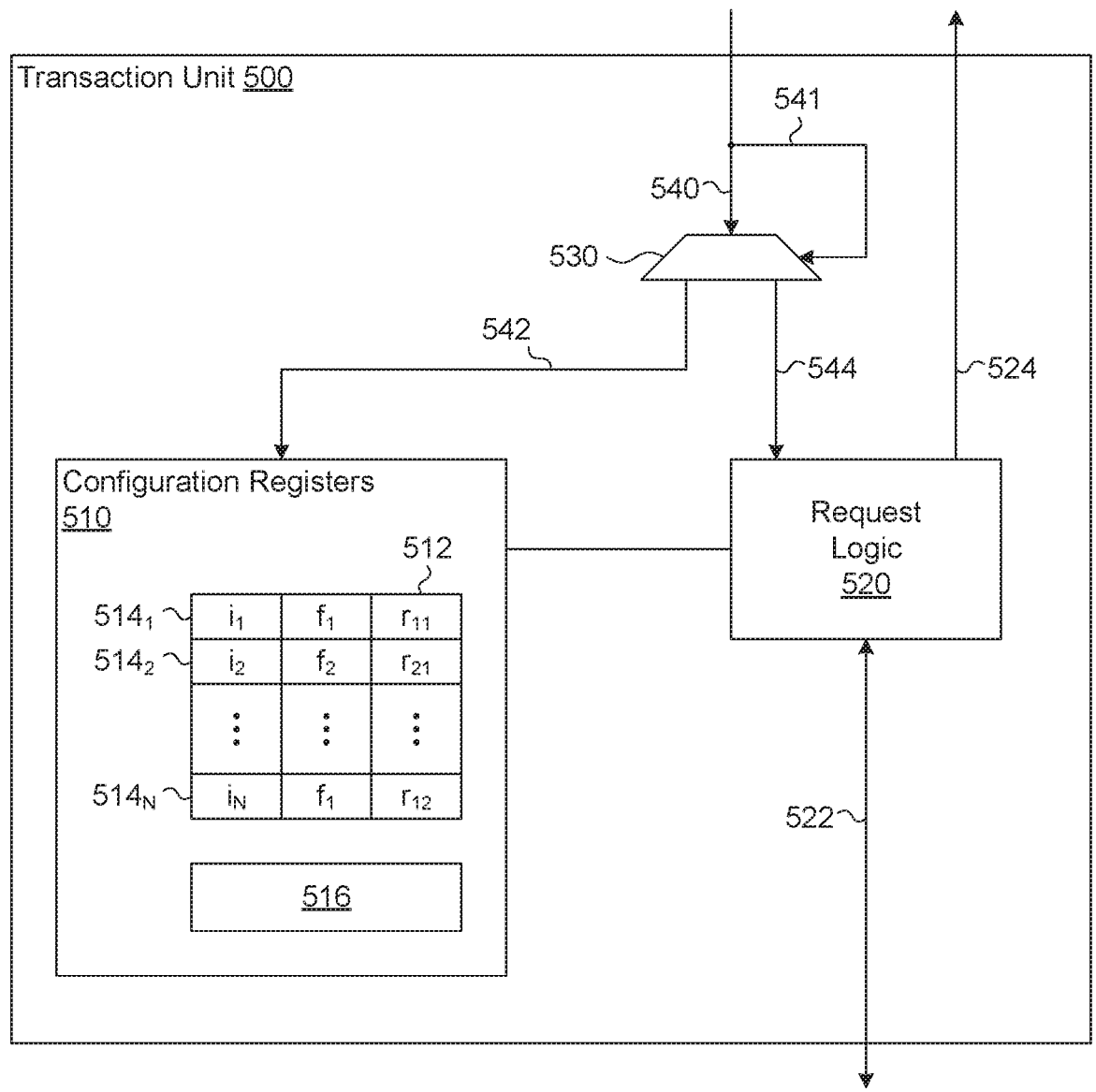
FIG. 5 illustrates a functional block diagram showing features of a transaction unit to request state information to be saved in a crash log according to an embodiment.

FIG. 5 shows features of a transaction unit 500 to request state information to be saved in a crash log according to an embodiment. Transaction unit 500 functions in a crash log agent as a bridge between a respective one or more functional blocks and other circuitry of the crash log agent which, for example, provides functionality of one of collection engine 106 or collection engine 350. In various embodiments, transaction unit 500 includes features of one of transaction units 351-353—e.g., where functionality of transaction unit 500 is facilitated with some or all operations of method 200.

As shown in FIG. 5, a transaction unit 500 of a crash log agent accommodates both coupling to a collection engine of the crash log agent, and communication between the crash log agent and one or more functional blocks coupled thereto. For example, transaction unit 500 comprises request logic 520, circuitry of which supports one or more protocols for communications 522 to access the one or more functional blocks. Transaction unit 500 further comprises a repository (e.g., including the illustrative configuration registers 510 shown) of reference information and/or other configuration state which is to determine at least in part the content of one or more commands which request logic 520 generates to retrieve state information. In an embodiment, transaction unit 500 is coupled to receive from the collection engine one or more signals (e.g., including the illustrative signals 540) which, for example, determine at least in part whether and/or how request logic 520 is to generate said one or more commands.

A demultiplexer 530 of transaction unit 500 is coupled to selectively direct various ones of signals 540 (responsive to a control signal 541) between either of a path 542 to configuration registers 510 or a path 544 to request logic 520. At a given time, signals 540 provide configuration registers 510 with command information 516 which indicates, in at least some high-level way, a functional block (and register thereof) that a command is to target in response to a trigger event. Such command information 516 is based on log structure information which defines some structure of a crash log record—e.g., where command information 516 includes a generic reference to a type of state information that request logic 520 is to retrieve. In one such embodiment, command information 516 indicates the information type in question with reference to a type of register that is a repository of the said state information. Based on command information 516, transaction unit 500 determines a specific register—of a specific functional block—that is to be targeted by a particular command.

At another time, request logic 520 receive a trigger signal (provided via path 544, for example) which indicates an actual or expected crash event, where request logic 520 retrieves state information from one or more registers in response to the trigger signal. For example, configuration registers 510 are programmed with, or otherwise preconfigured to access, a table 512 (or any of various other suitable data structures) which specifies or otherwise indicates a correspondence of one or more information types each with a particular register of a particular functional block. In an illustrative scenario according to one embodiment, table 512 identifies a correspondence of some or all of N information types $\{i_n\}$ (where the index n is any integer value from 1 to N) each with a respective one of Y functional blocks $\{f_y\}$ (where the index y is any integer value from 1 to N) and, more particularly, with a respective register of that corresponding one one of functional blocks $\{f_y\}$. By way of illustration and not limitation, an entry $51_{41}$ of table 512 corresponds the information type $i_1$ with the block-register combination $(f_1, r_{11})$—e.g., where an entry $514_2$ of table 512 corresponds the information type $i_2$ with the block-register combination $(f_2, r_{21})$, and where an entry $514_N$ of table 512 corresponds the information type $i_N$ with the block-register combination $(f_1, r_{12})$.

In one such embodiment, request logic 520 accesses configuration registers 510—e.g., based on an instruction of the log structure information (as represented in command information 516)—to identify a corresponding command to be generated for retrieving state information. For example, request logic 520 performs a selection, transition or other processing of a high-level representation of an information type (the representation in command information 516), where such processing is to identify a specific register to be targeted by a read command. Based on this identifying, request logic 520 determines a register identifier to be included in the command, a timing of the command and/or any of various other signaling characteristics to facilitate targeting of the register. In some embodiments, request logic 520 accesses table 512, to determine one or more such commands, in response to the trigger signal. In other embodiments, request logic 520 generates and stores some or all such commands at configuration registers 510 (or other such repository) prior to, and in anticipation of, the subsequent receiving of the trigger signal. With communications 522, request logic 520 receives the requested state information, which is subsequently provided to the collection agent (in a response 524).

Figure 6:
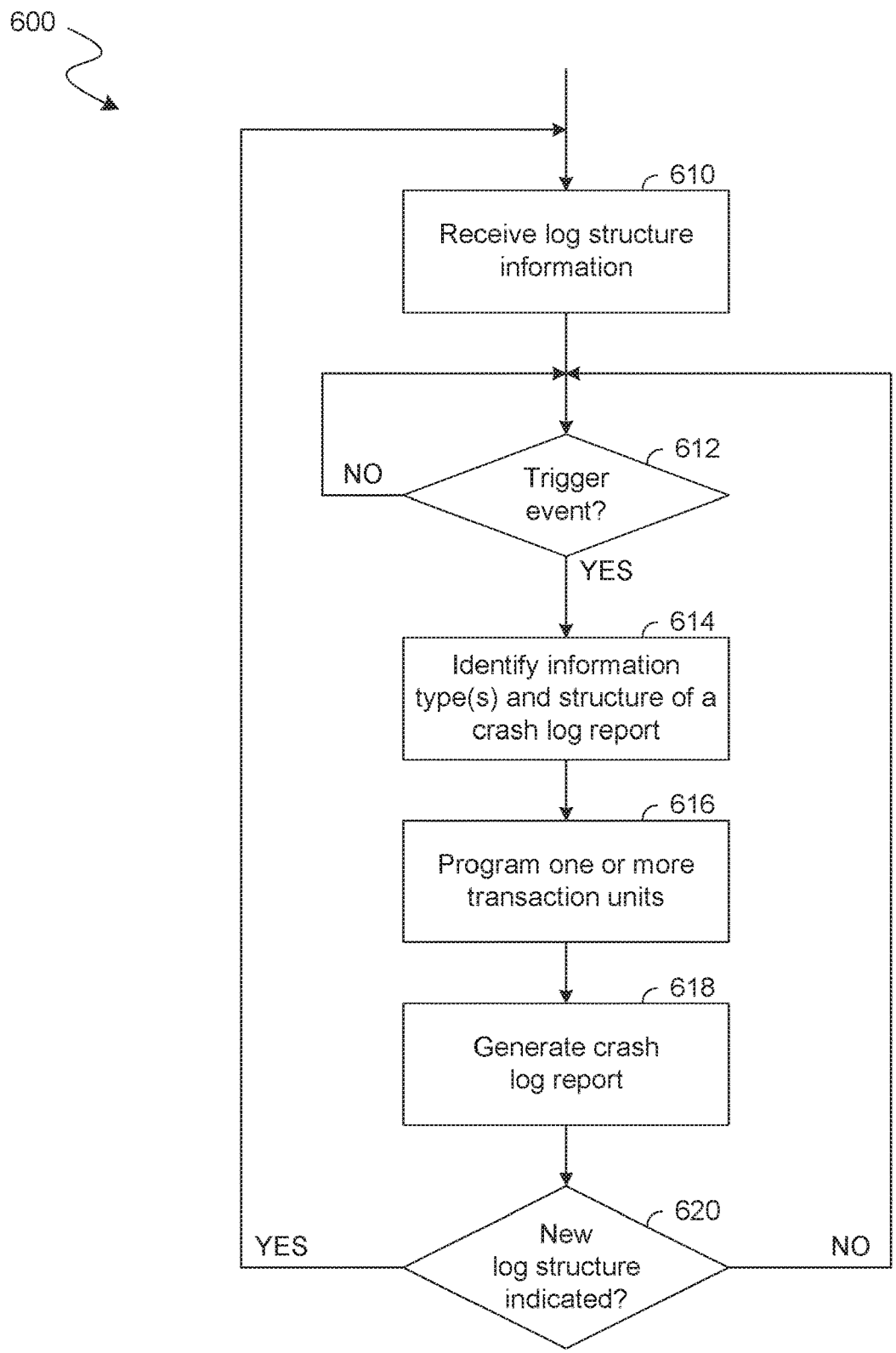
FIG. 6 illustrates a flow diagram showing features of a method for determining a structure of a crash log according to an embodiment.

FIG. 6 shows features of a method 600 for determining a structure of a crash log according to an embodiment. In various embodiments, method 600 includes features of method 200—e.g., wherein system 100, IC chip 300, collection engine 400 or transaction unit 500 are operated based on method 600.

As shown in FIG. 6, method 600 comprises (at 610) receiving log structure information (comprising a series of instructions, for example) which—explicitly or implicitly—defines a structure that a crash log record is to have. In an embodiment, the receiving at 610 comprises, for example, collection engine 106 receiving log structure information 104 or collection engine 350 receiving log structure information 332.

Method 600 further comprises determining (at 612) whether a trigger event has been detected—e.g., where the trigger event is an actual crash event or, alternatively, an event of a type which (according to some predefined criteria) is sufficient indicia that a crash event is expected. The determining at 612 is repeated, if necessary, until such a trigger event is detected. Where it is determined at 612 that a trigger event has been detected, method 600 (at 614) identifies the log structure and one or more types of information that, according to the log structure, are to be retrieved for inclusion in a record of a crash log. In one such embodiment, the identifying at 614 comprises identifying a correspondence of information types each with a respective field of a record structure, and identifying an order of fields of the record structure. Alternatively or in addition, the identifying at 614 comprises identifying, for a given field of the record structure, an encoding, unit of measurement, or other scheme according to which information is to be represented in the given field.

Method 600 further comprises (at 616) programming one or more transaction units of the crash log agent based on the log structure information which is most recently received at 610. In some embodiments, the programming at 616 comprises a collection engine of the crash log agent specifying or otherwise indicating to a given transaction unit one or more types of information which that transaction unit is to retrieve for the purpose of logging state information to a crash log record. By way of illustration and not limitation, such indicating of an information type comprises the collection engine providing to the given transaction unit an indirect (high-level) reference to a type of register—e.g., where the reference identifies a type of functional block which includes said register. In one such embodiment, the transaction unit processes this high-level reference to determine how a command is to subsequently target a specific register corresponding to the indicated register type. For example, one such transaction unit accesses reference information, based on the indirect reference to the register type, to retrieve an identifier of a specific register of a specific functional block.

Method 600 further comprises (at 618) generating a crash log report according to the current record structure—e.g., by signaling the programmed one or more transaction units each to retrieve respective retrieve state from a corresponding one or more functional blocks. In response, the one or more transaction units issue commands to variously access respective registers of the functional blocks. Subsequently, the collection engine variously queries the one or more transaction units to obtain and log the state information retrieved from the functional blocks.

At some point after the generating at 618, a determination is made (at 620) as to whether a new log structure has been, or will be, provided to the crash log agent. In one such embodiment, the generating at 618 includes (for example) collection engine 350 detecting that configuration unit 320 has replaced, updated or otherwise changed log structure information 332 in repository 330. Where a new log structure has been indicated by the determining at 620, method 600 proceeds to a receiving thereof (at 610). However, where no such new log structure is indicated by the determining at 620, method 600 returns to the detecting of a next trigger event (if any) at 612.

In an alternative embodiment, the identifying at 614 and the programming at 616 are performed prior to the detecting for a trigger event at 612—e.g., wherein one or more transaction units are programmed based on the log structure prior to, and in anticipation of, a subsequent occurrence of a crash event. Alternatively or in addition, in some embodiments, a collection engine variously reprograms some or all transaction unit one or more times during (and to facilitate) a collection of state information in response to a trigger event.

Figure 7:
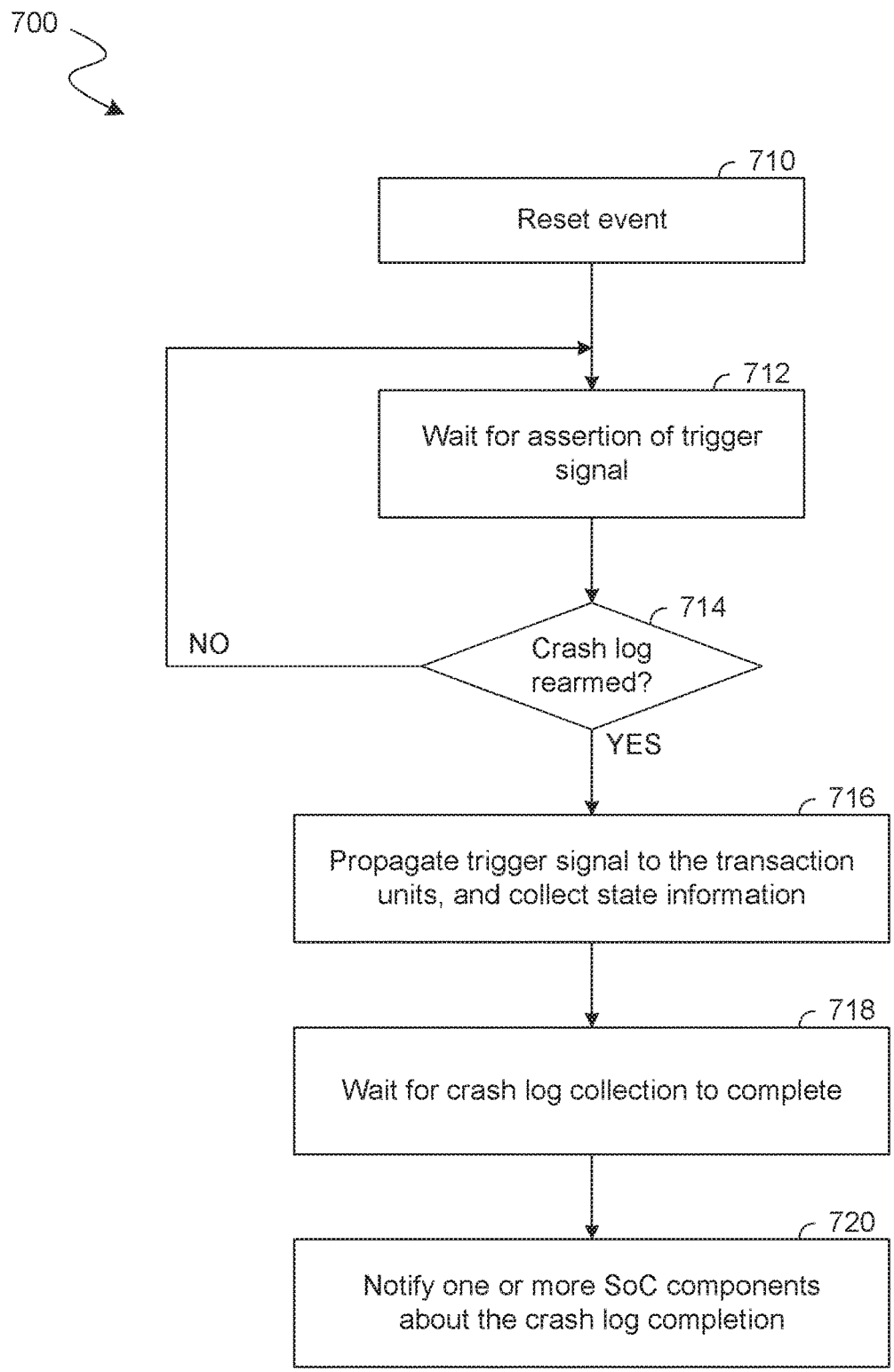
FIG. 7 illustrates a flow diagram showing features of a method for storing state information to a crash log according to an embodiment.

FIG. 7 shows features of a method 700 for storing state information to a crash log according to an embodiment. Method 700 illustrates an embodiment wherein, due to a rearming mechanism, a given round of state information collection (the collection to facilitate creation of one particular crash log record) can happen only once per system reset. Such a rearming mechanism mitigates logging errors that, for example, would otherwise result from multiple successive trigger events which are each related to the same crash event. In various embodiments, method 700 includes features of, or is performed with, one of methods 200, 600—e.g., wherein system 100, IC chip 300, collection engine 400 or transaction unit 500 are operated based on method 700.

As shown in FIG. 7, method 700 comprises (at 710) detecting the completion of a reset event, such as a reboot, which puts a given set of circuit resources—e.g., including those of system 100 or IC chip 300—into an operational state which (according to some predefined criteria) is capable of crashing. Method 700 further comprises (at 712) waiting for an assertion of a trigger signal—such as signal 341, for example—which indicates that a system crash event has begun, or is expected to begin.

In response to detecting the trigger signal, method 700 determines (at 714) whether the crash log agent has been placed into a "rearmed" state which enables a next collection of state information to facilitate creation of a crash log record which is to correspond to the most recently indicated crash event. In one such embodiment, an operating system (executed by a processor which is coupled to the crash log agent) is responsible for rearming the crash log agent—e.g., by setting a mode register or other configuration logic thereof.

Where it is determined at 714 that the crash log agent is not yet rearmed, method 700 waits for the detection of a next subsequent trigger signal (at 712). Where it is instead determined at 714 that the crash log agent is rearmed, method 700 (at 716) propagates the detected trigger signal to those one or more of the transaction units which are programmed by the collection engine to variously retrieve state information each from a respective one or more functional blocks. The one or more transaction units thus retrieve the state information and relay it to the collection engine for recording in the crash log. After waiting for the crash log collection to complete (at 718), method 700 notifies one or more system-on-chip components of the completion (at 720).

Figure 8:
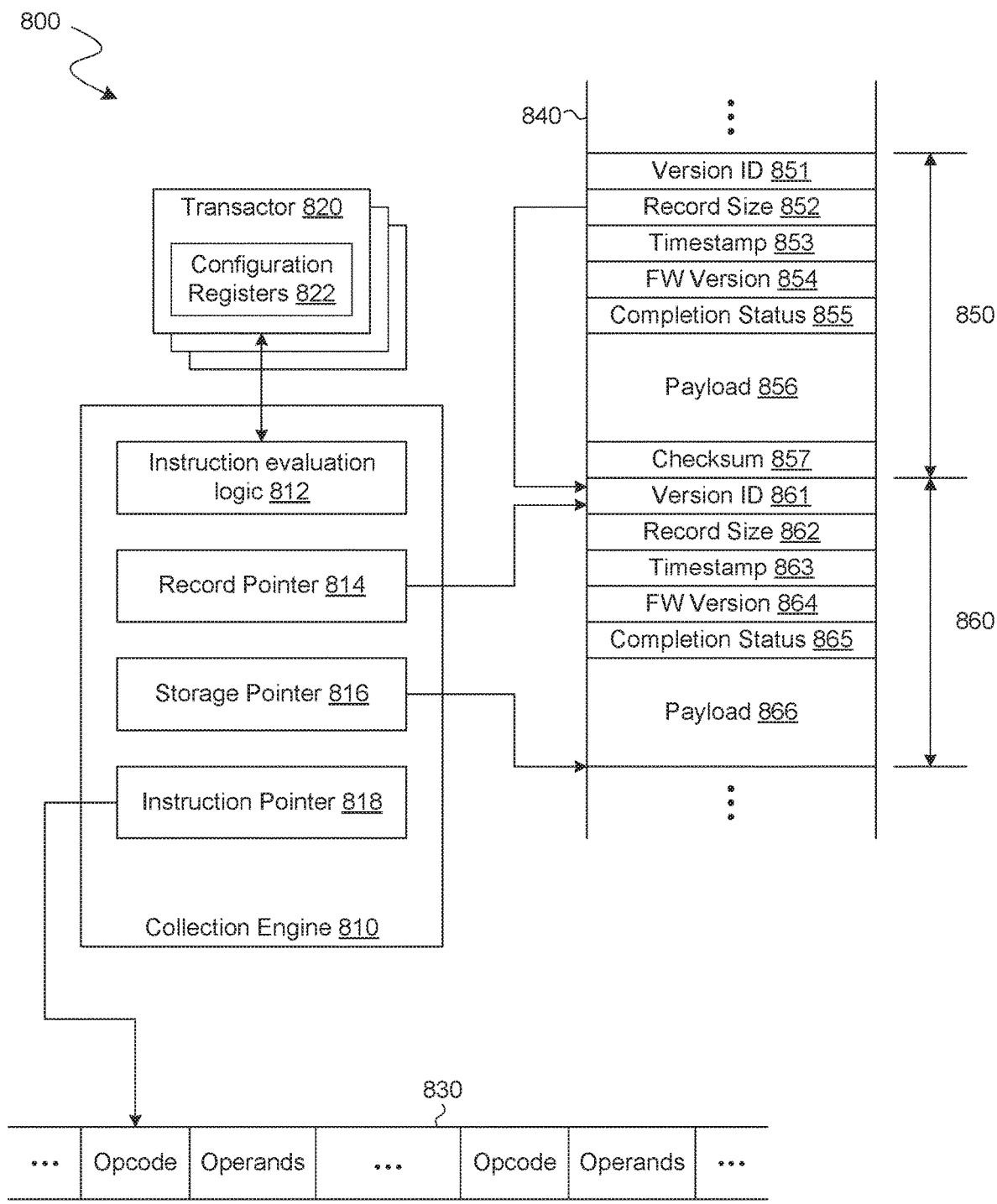
FIG. 8 illustrates a functional block diagram showing features of a crash log agent to determining a structure of a crash log according to an embodiment.

FIG. 8 shows features of a crash log agent 800 to determine a structure of a crash log record according to an embodiment. In various embodiments, crash log agent 800 includes features of one of collection engine 106 or crash log agent 310—e.g., where functionality of crash log agent 800 is provided according to one of methods 200, 600, 700.

As shown in FIG. 8, crash log agent 800 comprises a collection engine 810 and one or more transaction units (e.g., including the illustrative transactor 820 shown) which are variously coupled thereto. In one such embodiment, collection engine 810 and transactor 820 correspond functionally to collection engine 350 and transaction unit 351 (respectively).

An instruction pointer 818 of collection engine 810 is used to sequentially access instructions of log structure information 830 which define some or all structure that a crash log record is to have. Collection engine 810 comprises circuitry to process a given instruction of log structure information 830 to determine which transaction circuitry of crash log agent 800 is to generate one or more commands corresponding to that given instruction. By way of illustration and not limitation, an instruction evaluation logic 812 of crash log agent 800 provides functionality (such as that of instruction decoder 420) to select transactor 820 from among multiple transaction units of crash log agent 800. Such selection is based, for example, on an instruction of log structure information 830 having a generic identifier of an information type which corresponds to transactor 820.

Based on the selection of transactor 820, instruction evaluation logic 812 sends to configuration registers 822 of transactor 820 information which facilitates the generation of the one or more commands. Such information includes that which is provided, for example, to configuration registers 510. In one example embodiment, instruction evaluation logic 812 provides to configuration registers 822 one or more generic identifiers each of a respective type of state information that transactor 820 is to retrieve from one or more functional blocks. Transactor 820 comprises circuitry to perform a table lookup and/or other suitable operation to determine, for each of the one or more generic identifiers, a respective register of a specific functional block from which corresponding state information is to be retrieved.

In an illustrative scenario according to one embodiment, collection engine 810 uses pointers to variously create, populate and/or otherwise access records of a crash log 840. By way of illustration and not limitation, a record pointer 814 points to a memory location where a most recently created record of crash log 840 begins—e.g., wherein another storage pointer 816 points to a memory location where a next write to crash log 840 is to occur. In the example embodiment shown, creation of one record 850 of crash log 840 has completed, and the writing of state information to a next record 860 of crash log 840 is underway. The respective structures of record 850 and record 860 are based on respective log structure information—e.g., wherein the structure of record 860 is defined by log structure information 830 (and, for example, where the structure of record 850 is instead based on other instructions of different log structure information.)

In an illustrative scenario according to one embodiment, record 850 comprises a payload 856 and a header portion including a version ID field 851 which (for example) is to be used by decode software to uniquely identify the payload of record 850. A record size field 852 of the header portion identifies the overall size of record 850 (including the header and a payload 856)—e.g., so that decode software is able to find the next record in the crash log storage. A timestamp field 853 indicates a time when the creation of record 850 was triggered—e.g., wherein a firmware (FW) version field 854 identifies a specific version of firmware which is used to generate record 850. A completion status field 855 of the header portion indicates a current status of the collection of record 850. A checksum field 857 is used to verify the integrity of record 850—e.g., where the checksum is calculated by collection engine 106, collection engine 350 or other such logic.

In one such embodiment, record 860 similarly includes a payload 866, and a header portion including a version ID field 861, record size field 862, timestamp field 863, FW version field 864, completion status field 865—e.g., wherein the respective structures of payloads 856, 866 are defined by log structure information such as that illustrated by log structure information 830. The particular structure and contents shown for records 850, 860 is merely illustrative, and not limiting on other embodiments.

In various embodiments, instructions of log structure information 830 are based on an instruction set which, for example, includes an instruction to start the collection of a new record of a crash log. For example, one such instruction is used to update the completion status field 855—to indicate completion of record 850—to create a standard header for a next record 860 (e.g., the header including fields 861-865), and to populate the Version ID field 861 with a specified unique identifier.

Alternatively or in addition, the instruction set comprises an instruction to configure a given transaction unit to set a particular one or more parameters of a state information request. Alternatively or in addition, the instruction set comprises an instruction to query a transaction unit for one or more state information values, each from a respective register of a corresponding functional block, and (for example) to store said one or more values in a crash log. Alternatively or in addition, the instruction set comprises an instruction to update a completion status field of a record header—e.g., to indicate the logging of one or more encountered errors, or to otherwise keep track of an overall progress of the crash log collection. Alternatively or in addition, the instruction set comprises an instruction to complete the collection of a crash log record—e.g., by updating a completion status field of the record accordingly, and by writing a termination symbol at an end of the current record. Such an instruction set includes any of a variety of additional or alternative instructions, in some embodiments.

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10A:
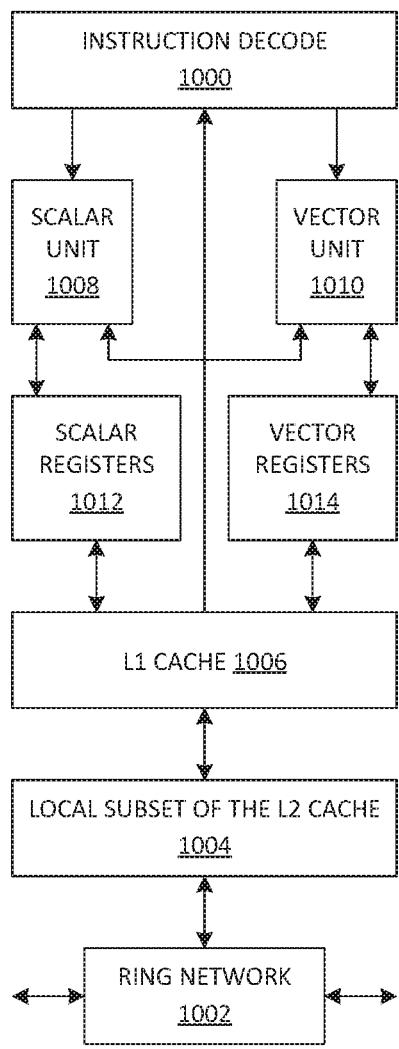
FIGS. 10A-B illustrate a block diagram of a more specific exemplary in-order core architecture, which core would be one of several logic blocks (including other cores of the same type and/or different types) in a chip.
Figure 10B:
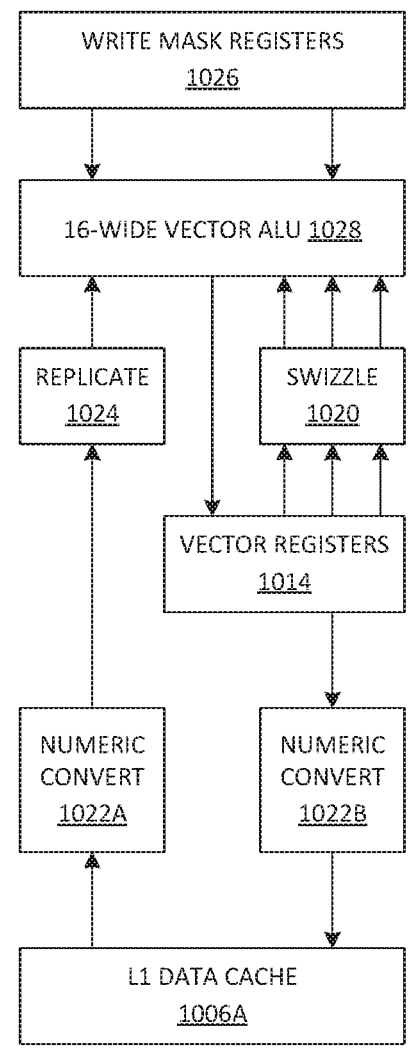

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
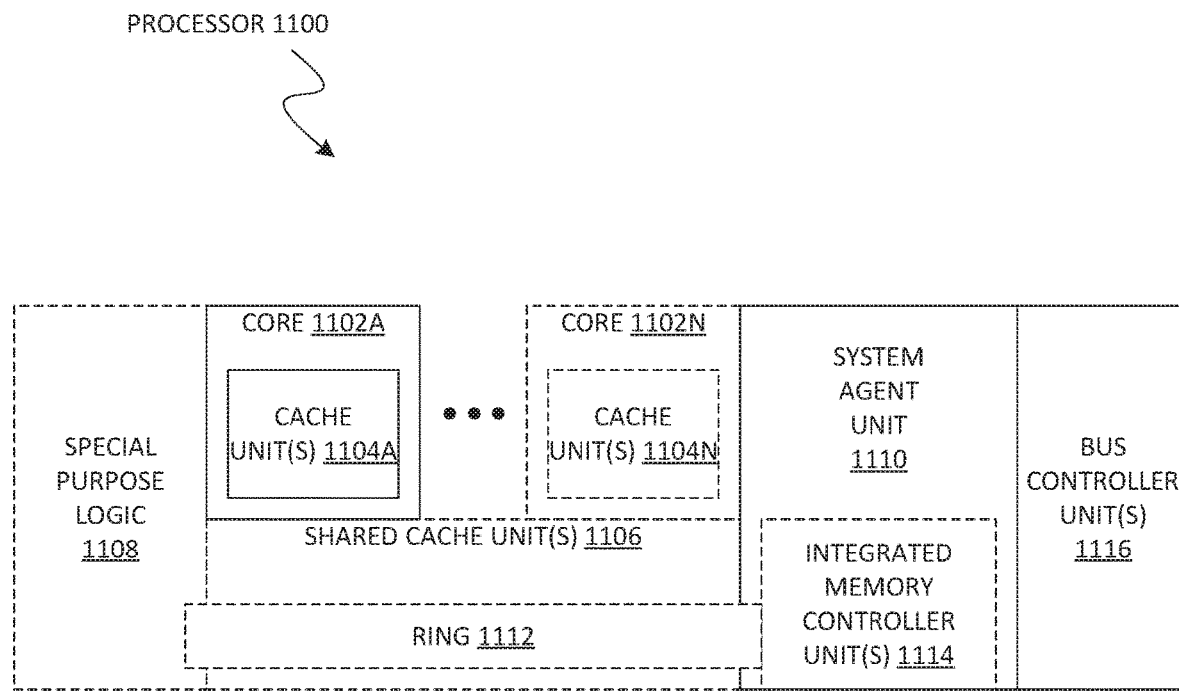
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
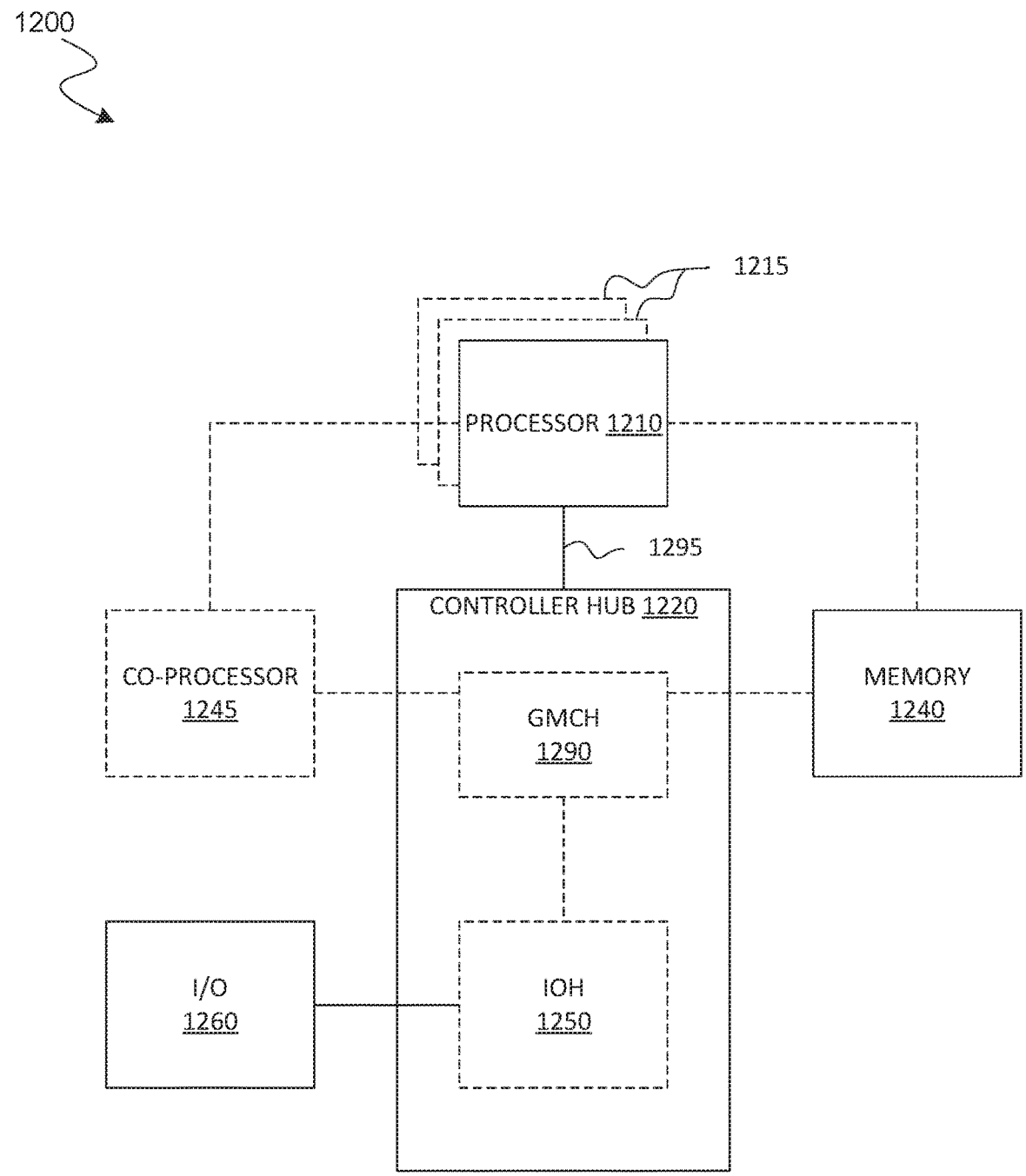
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
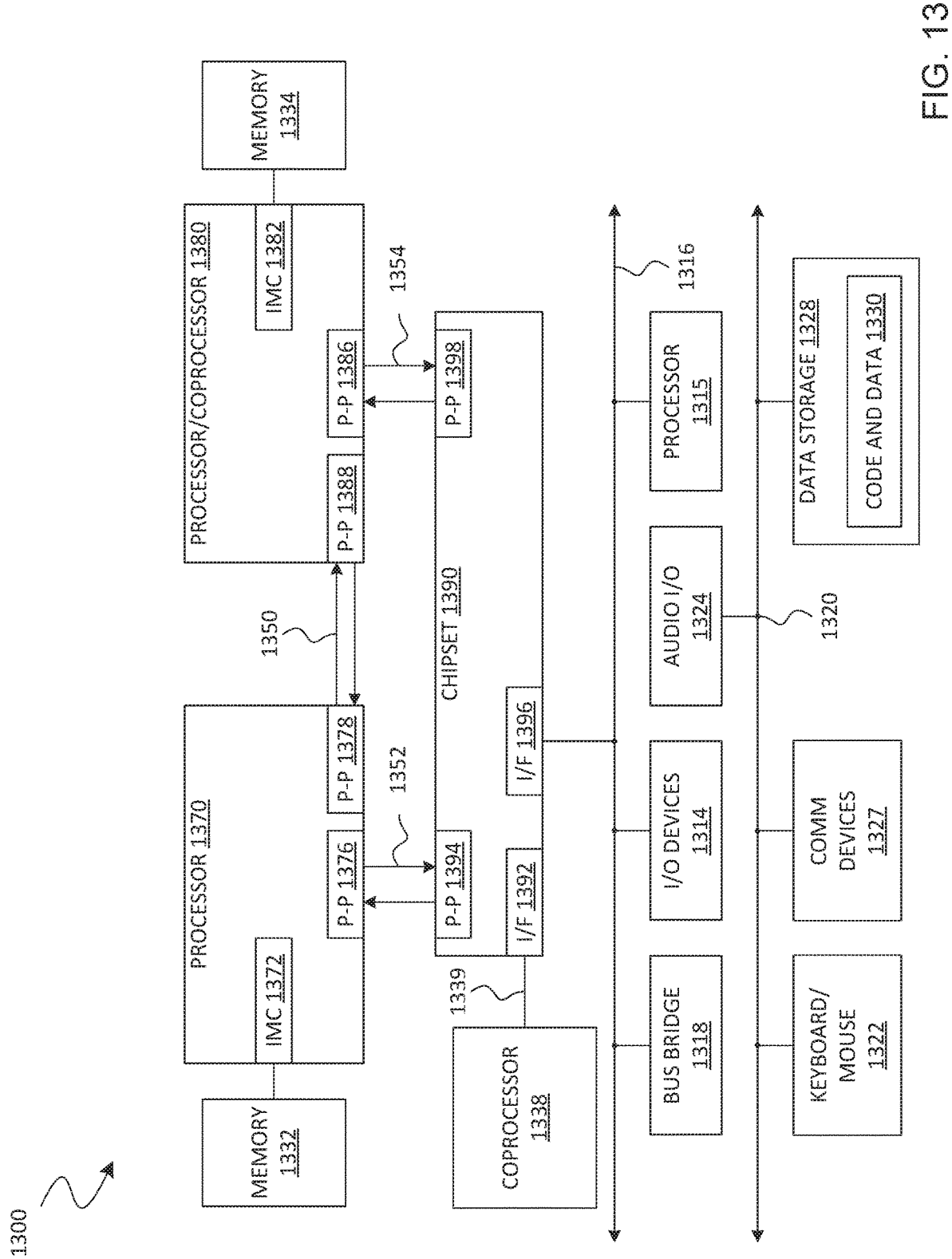

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
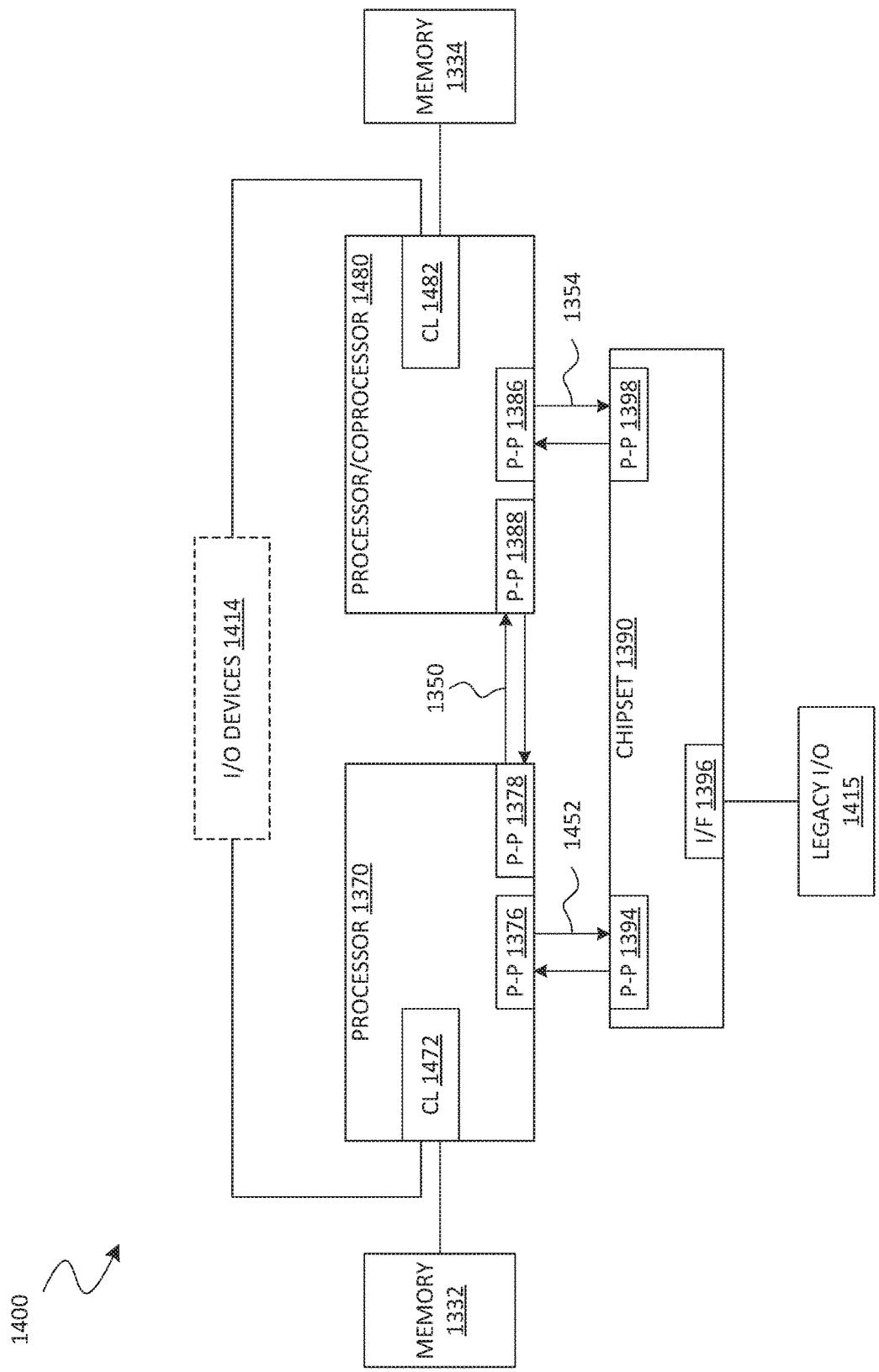

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1472, 1482, but also that I/O devices 1414 are also coupled to the control logic 1472, 1482. Legacy I/O devices 1415 are coupled to the chipset 1490.

Figure 15:
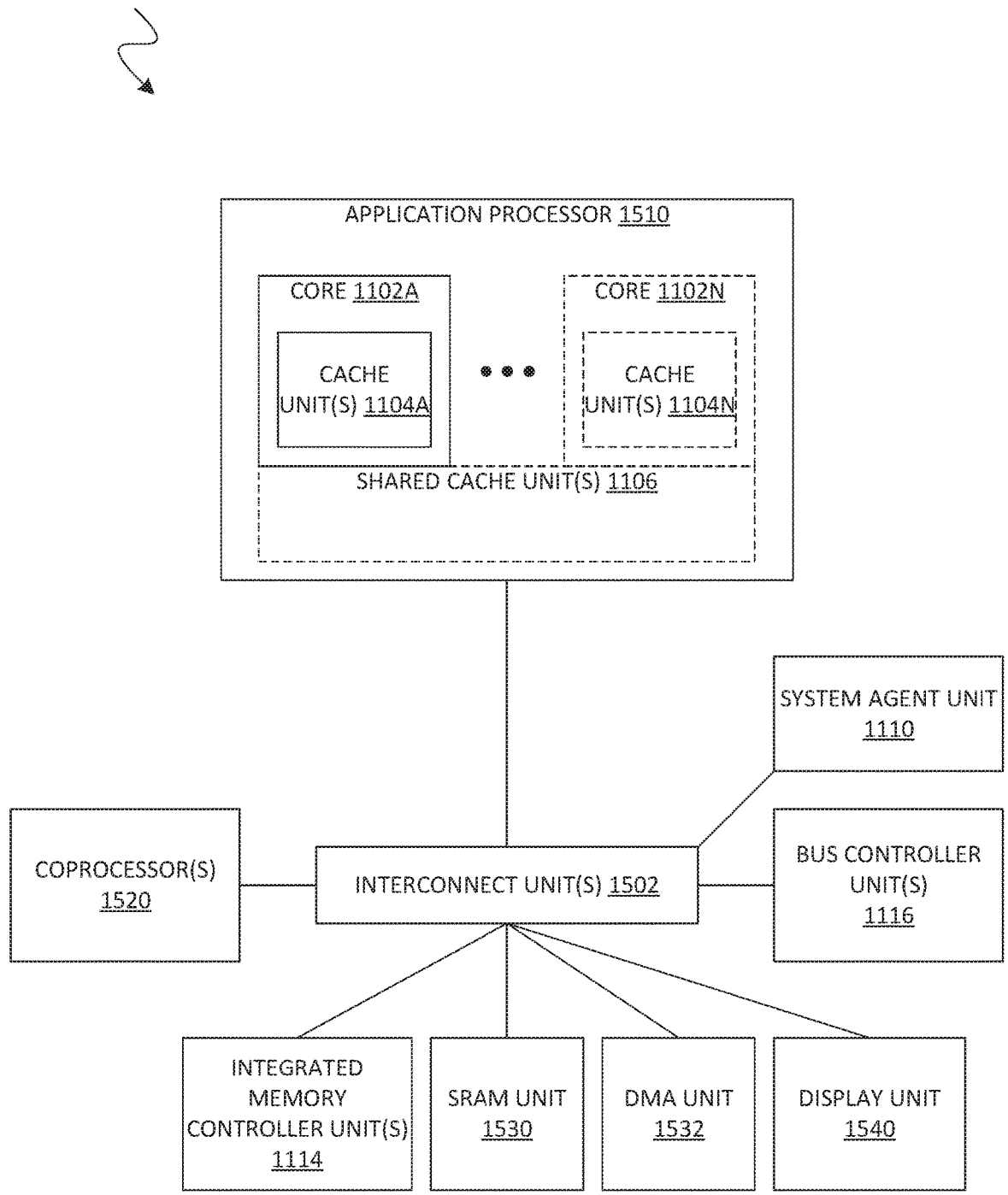

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
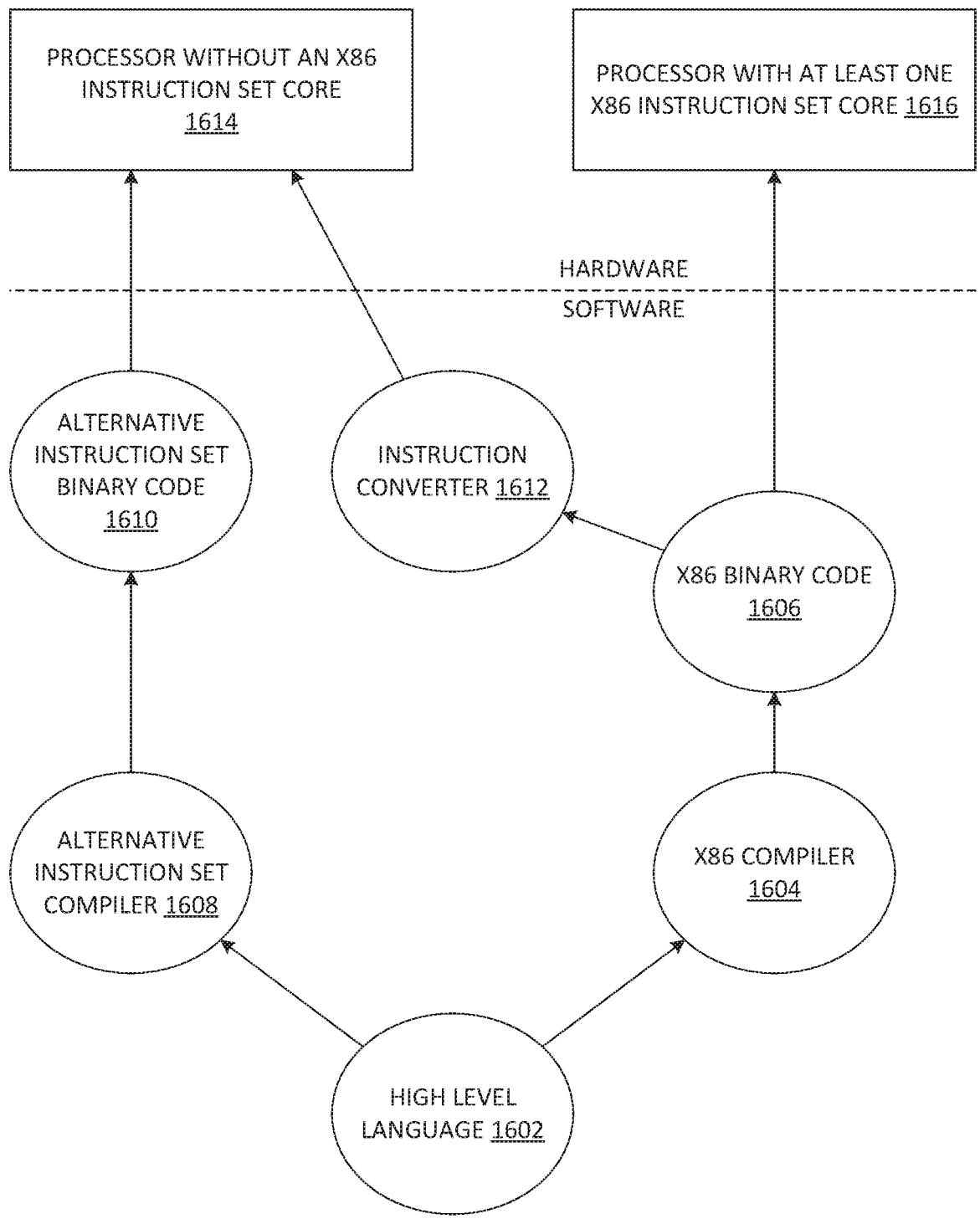
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for retrieving state information to be saved to a crash log are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit (IC) comprising:
 a crash log agent comprising:
  a collection engine comprising circuitry to:
   receive instructions which define a record structure, the instructions comprising a generic identifier of an information type to indicate a first correspondence of the information type to a field of the record structure; and
   access reference information, based on the generic identifier, to determine a second correspondence of the information type to a functional block; and
  a transaction unit coupled to the collection engine, wherein, based on the second correspondence, the collection engine is to communicate that the transaction unit is to retrieve state information of the information type, wherein the transaction unit comprises circuitry to send a command, in response to an indication of a crash event, to access a register of the functional block;
 wherein one of the collection engine or the transaction unit is to determine, based on the first correspondence and the generic identifier, that the register is a repository of the state information.

2. The IC of claim 1, wherein:
 the functional block is a first functional block, wherein the IC further comprises multiple functional blocks including the first functional block;
 the transaction unit is a first transaction unit; and
 the crash log agent comprises multiple transaction units, including the first transaction unit, each coupled to communicate with a different respective one or more of the multiple functional blocks.

3. The IC of claim 2, wherein the reference information identifies the first transaction unit as being coupled to support communication with the first functional block; and
wherein, based on the generic identifier and the reference information, the collection engine is to select the first transaction unit from among the multiple transaction units to retrieve state information of the information type.

4. The IC of claim 2, wherein the reference information identifies a correspondence of multiple transaction units each with a different respective one or more functional block types.

5. The IC of claim 2, wherein, for each transaction unit of the multiple transaction units:
the collection engine is to indicate to the transaction unit a respective one or more registers of the multiple functional blocks that the transaction unit is to access; and
the transaction unit is to detect the indication of the crash event after the collection engine indicates the respective one or more registers to the transaction unit.

6. The IC of claim 1, wherein:
the functional block is a first functional block;
the IC further comprises one or more functional blocks including the first functional block;
the collection engine is to indicate to the transaction unit multiple registers of the one or more functional blocks that the transaction unit is to access; and
the transaction unit is to detect the indication of the crash event after the collection engine indicates the multiple registers to the transaction unit.

7. The IC of claim 1, wherein the reference information is first reference information, wherein a first transaction unit comprises second reference information which identifies a correspondence of functional block types each with a respective one or more register types.

8. The IC of claim 7, wherein, for multiple register types, the second reference information further identifies a respective indicator to target a register which is of the register type.

9. A method comprising:
at a collection engine of a crash log agent:
receiving instructions which defines a record structure, wherein the instructions comprise a generic identifier of an information type to indicate a first correspondence of the information type to a field of the record structure, wherein the collection engine is coupled to a functional block comprising a register;
based on the generic identifier, accessing reference information to determine a second correspondence of the information type to the functional block; and
based on the second correspondence, communicating that a transaction unit of the crash log agent is to retrieve state information of the information type; and
with the transaction unit, sending a command, in response to an indication of a crash event, to access the register, wherein one of the collection engine or the transaction unit determines, based on the first correspondence and the generic identifier, that the register is a repository of the state information.

10. The method of claim 9, wherein:
the functional block is a first functional block, wherein an integrated circuit (IC) comprises multiple functional blocks including the first functional block;
the transaction unit is a first transaction unit; and
the crash log agent comprises multiple transaction units, including the first transaction unit, each coupled to communicate with a different respective one or more of the multiple functional blocks.

11. The method of claim 10, wherein the reference information identifies the first transaction unit as being coupled to support communication with the first functional block, the method further comprising:
with the collection engine, selecting the first transaction unit from among the multiple transaction units, based on the generic identifier and the reference information, to retrieve state information of the information type.

12. The method of claim 10, wherein the reference information identifies a correspondence of multiple transaction units each with a different respective one or more functional block types.

13. The method of claim 9, wherein:
the functional block is a first functional block;
an integrated circuit (IC) comprises one or more functional blocks including the first functional block;
the collection engine indicates to the transaction unit multiple registers of the one or more functional blocks that the transaction unit is to access; and
the transaction unit detects the indication of the crash event after the collection engine indicates the multiple registers to the transaction unit.

14. The method of claim 9, wherein the reference information is first reference information, wherein a first transaction unit comprises second reference information which identifies a correspondence of functional block types each with a respective one or more register types.

15. A system comprising:
an integrated circuit (IC) comprising:
a crash log agent comprising:
a collection engine comprising circuitry to:
receive instructions which define a record structure, the instructions comprising a generic identifier of an information type to indicate a first correspondence of the information type to a field of the record structure; and
access reference information, based on the generic identifier, to determine a second correspondence of the information type to a functional block; and
a transaction unit coupled to the collection engine, wherein, based on the second correspondence, the collection engine is to communicate that the transaction unit is to retrieve state information of the information type, wherein the transaction unit comprises circuitry to send a command, in response to an indication of a crash event, to access a register of the functional block;
wherein one of the collection engine or the transaction unit is to determine, based on the first correspondence and the generic identifier, that the register is a repository of the state information; and
a display device coupled to the IC, the display device to display an image based on a signal communicated with the functional block.

16. The system of claim 15, wherein:
the functional block is a first functional block, wherein the IC further comprises multiple functional blocks including the first functional block;

the transaction unit is a first transaction unit; and the crash log agent comprises multiple transaction units, including the first transaction unit, each coupled to communicate with a different respective one or more of the multiple functional blocks.

17. The system of claim 16, wherein the reference information identifies the first transaction unit as being coupled to support communication with the first functional block; and wherein, based on the generic identifier and the reference information, the collection engine is to select the first transaction unit from among the multiple transaction units to retrieve state information of the information type.

18. The system of claim 16, wherein the reference information identifies a correspondence of multiple transaction units each with a different respective one or more functional block types.

19. The system of claim 16, wherein, for each transaction unit of the multiple transaction units:

the collection engine is to indicate to the transaction unit a respective one or more registers of the multiple functional blocks that the transaction unit is to access; and the transaction unit is to detect the indication of the crash event after the collection engine indicates the respective one or more registers to the transaction unit.

20. The system of claim 15, wherein:

the functional block is a first functional block;

the IC further comprises one or more functional blocks including the first functional block;

the collection engine is to indicate to the transaction unit multiple registers of the one or more functional blocks that the transaction unit is to access; and the transaction unit is to detect the indication of the crash event after the collection engine indicates the multiple registers to the transaction unit.

* * * * *